United States Patent
Roy et al.

(10) Patent No.: US 10,701,959 B2
(45) Date of Patent: Jul. 7, 2020

(54) SUBCRITICAL WATER EXTRACTION OF FRUIT MATERIAL

(71) Applicant: Ocean Spray Cranberries, Inc., Lakeville-Middleboro, MA (US)

(72) Inventors: Soumya Roy, Lakeville-Middleboro, MA (US); Ryan Moriarty, Lakeville-Middleboro, MA (US); David Clancy, Lakeville-Middleboro, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 0 days.

(21) Appl. No.: 15/750,120

(22) PCT Filed: Aug. 4, 2016

(86) PCT No.: PCT/US2016/045656
§ 371 (c)(1),
(2) Date: Feb. 2, 2018

(87) PCT Pub. No.: WO2017/024183
PCT Pub. Date: Feb. 9, 2017

(65) Prior Publication Data
US 2018/0220680 A1    Aug. 9, 2018

Related U.S. Application Data

(60) Provisional application No. 62/200,995, filed on Aug. 4, 2015.

(51) Int. Cl.
*A23L 2/04* (2006.01)
*A23L 33/105* (2016.01)
*A23N 1/00* (2006.01)
*B01D 11/02* (2006.01)
*A23L 29/231* (2016.01)
*B01D 11/00* (2006.01)

(52) U.S. Cl.
CPC ............... *A23L 2/04* (2013.01); *A23L 29/231* (2016.08); *A23L 33/105* (2016.08); *A23N 1/00* (2013.01); *B01D 11/0288* (2013.01); *B01D 11/0292* (2013.01); *A23V 2002/00* (2013.01); *B01D 2011/002* (2013.01)

(58) Field of Classification Search
CPC ........ A23L 2/04; A23L 29/231; A23L 33/105; A23N 1/00; B01D 11/0288; B01D 11/0292; B01D 2011/002; A23V 2002/00
See application file for complete search history.

(56) References Cited

U.S. PATENT DOCUMENTS

| | | |
|---|---|---|
| 6,143,337 A | 11/2000 | Fishman et al. |
| 7,208,181 B1 | 4/2007 | King et al. |
| 2006/0003053 A1 | 1/2006 | Ekanayake et al. |
| 2013/0095209 A1 | 4/2013 | Manitus et al. |

OTHER PUBLICATIONS

International Preliminary Report on Patentability in International Application No. PCT/US2016/045656, dated Feb. 6, 2018, 13 pages.
International Search Report and Written Opinion in International Application No. PCT/US2016/045656, dated Dec. 8, 2016, 17 pages.

*Primary Examiner* — Anthony J Weier
(74) *Attorney, Agent, or Firm* — Fish & Richardson P.C.

(57) ABSTRACT

The specification provides methods for extracting juice, anthocyanin, pectin, proanthocyanidin, and/or other phenolic compounds, from fruit material such as cranberry fruit, presscake, and/or pomace, through a sequential extraction procedure.

18 Claims, 7 Drawing Sheets

US 10,701,959 B2

SUBCRITICAL WATER EXTRACTION OF FRUIT MATERIAL

RELATED APPLICATION

The present application is a 371 U.S. National phase application of PCT/US2016/045656, filed on Aug. 4, 2016, which claims the benefit of U.S. Application No. 62/200,995, filed on Aug. 4, 2015, which is incorporated herein by reference in its entirety.

TECHNICAL FIELD

The claimed methods relate to the extraction of juice, anthocyanin, pectin, proanthocyanidin, and/or other phenolic compounds from fruit material, especially cranberries, for producing various food products.

BACKGROUND

Fruits such as cranberries are rich in bioactive components, including anthocyanins, proanthocyanidins (PACs), and other phenolic compounds. Recent studies show that more polar compounds found in cranberries, such as oligosaccharides, may also impart major health benefits (Coleman et al., Anti-Adhesion Properties of Cranberry Products: Current Status and New Directions, American Society of Pharmacognosy Annual Meeting, St. Louis, Mo., July 2013).

Polar compounds, e.g., phenolic compounds, are typically extracted using organic polar solvents such as alcohol and acetone (Nafisi-Movaghar et al., U.S. Pat. No. 5,912,363). To be used in foodstuffs, such extracts need to be dehydrated to remove harmful organic solvents. If, however, water is used as a solvent, the extract may not need to be evaporated or could be partially evaporated and be directly be added to food or beverages. The selective capture and concentration of juice, anthocyanin, pectin, proanthocyanidin, and/or other phenolic compounds may thus open up novel opportunities in the field of product application relative to delivering those unique benefits.

SUMMARY

An extraction process, e.g., a single-step or multi-step process, for preparing juice, anthocyanin, pectin, proanthocyanidin, and/or other phenolic compound extracts from fruit material is described. When a multi-step process is utilized, subsequent extraction(s) can be performed at about the same temperature or at a higher temperature than the previous extraction. For example, in a first extraction step performed at a lower temperature, e.g., about 20° C. to about 50° C., fruit material is subjected to extraction in water. This first extraction step removes the majority of the inherent soluble fruit components, e.g., sugars and acids, from the fruit material, producing a juice extract. The once-extracted fruit material can be subjected to a second extraction with water at about the same temperature or at a higher temperature than the first extraction, e.g., about 40° C. to about 120° C., or about 9° C. to about 110° C. This second extraction step extracts anthocyanin, producing an anthocyanin-rich extract and a twice-extracted fruit material. The twice-extracted fruit material can be subjected to a third extraction with water at about the same temperature or at a higher temperature than the second extraction, e.g., about 100° C. to about 145° C., or about 120° C. to about 140° C. This third extraction step extracts pectin, producing a pectin-rich extract and a thrice-extracted fruit material. Optionally, the thrice-extracted fruit material can be subjected to a fourth extraction with water at about the same temperature or at a higher temperature than the third extraction, e.g., about 130° C. to about 165° C. This fourth extraction step extracts proanthocyanidin, producing a proanthocyanidin-rich extract and a four times-extracted fruit material. The four times-extracted fruit material can then be subjected to a fifth extraction with water at about the same temperature or at a higher temperature than the fourth extraction, e.g., about 145° C. to about 200° C. This fifth extraction step extracts other phenolic compounds, producing a phenol-rich extract and a five times-extracted fruit material. Skilled practitioners will appreciate that any one, two, three, or four extractions can be performed on their own, and that that not all five extractions need to be performed together in sequence. Skilled practitioners will also appreciate that a mixture of proanthocyanidins and phenolic compounds can be extracted at temperatures and pressures that could be used to extract either proanthocyanidins or phenolic compounds. For example, the present methods include processing fruit material at, e.g., about 160° C. to about 180° C., e.g., about 162° C., 165° C., 170° C., 172° C., 175° C., 178° C., or at a temperature in a range between any two of the above-referenced values, under a pressure of about 250 psi to about 1000 psi to maintain water in a liquid state, e.g., about 275 psi, 300 psi, 325 psi, 350 psi, 375 psi, 400 psi, 425 psi, 450 psi, 475 psi, 500 psi, 525 psi, 550 psi, 575 psi, 600 psi, 625 psi, 650 psi, 675 psi, 700 psi, 725 psi, 750 psi, 775 psi, 800 psi, 825 psi, 850 psi, 875 psi, 900 psi, 925 psi, 950 psi, 975 psi, or about 1000 psi, to provide a mixture of proanthocyanidins and phenolic compounds.

One, two, three, four, or all five extractions can be performed in some embodiments using a countercurrent apparatus. A five-step extraction is therefore particularly useful because juice, anthocyanin, pectin, proanthocyanidin, and other phenolic compounds can be removed from fruit material without using any harmful solvents.

Accordingly, in one aspect, the present specification provides a method for processing fruit material with water. The method includes, e.g., treating the fruit material in a first extraction by immersing the fruit material in water at a relatively low temperature, e.g., a temperature of about 20° C. to about 50° C., thereby providing a once-extracted fruit material and a juice extract; collecting the juice extract; treating the once-extracted fruit material in a second extraction by immersing the fruit material in water at a temperature of about 40° C. to about 120° C., or about 90° C. to about 110° C., thereby providing a twice-extracted fruit material and an anthocyanin-rich extract; collecting the anthocyanin-rich extract; treating the twice-extracted fruit material in a third extraction by immersing the fruit material in water at a temperature of about 100° C. to about 145° C., or about 120° C. to about 140° C., thereby providing a thrice-extracted fruit material and a pectin-rich extract; and collecting the pectin-rich extract.

In some embodiments, the thrice-extracted fruit material is subjected to a fourth extraction by immersing the fruit material in water at a temperature of about 130° C. to about 165° C., thereby providing a four times-extracted fruit material and a proanthocyanidin-rich extract; and collecting the proanthocyanidin-rich extract. In one embodiment, the method includes treating the four times-extracted fruit material in a fifth extraction by immersing the fruit material in water at a temperature of about 145° C. to about 200° C., thereby providing a five times-extracted fruit material and a phenol-rich extract. In some embodiments, the method includes collecting the phenol-rich extract.

In some implementations, a method for processing fruit material comprises treating the fruit material in a first extraction by immersing the fruit material in water at a temperature of about 20° C. to about 50° C., thereby providing a once-extracted fruit material and a juice extract, and collecting the juice extract, treating the once-extracted fruit material in a second extraction by immersing the once-extracted fruit material in water at a temperature of about 40° C. to about 120° C., or about 90° C. to about 110° C., thereby providing a twice-extracted fruit material and an anthocyanin-rich extract, collecting the anthocyanin-rich extract, treating the twice-extracted fruit material in a third extraction by immersing the twice-extracted fruit material in water at a temperature of about 100° C. to about 145° C., or about 120° C. to about 140° C., thereby providing a thrice-extracted fruit material and a pectin-rich extract and collecting the pectin-rich extract. In some embodiments, the method further comprises treating the thrice-extracted fruit material in a fourth extraction by immersing the thrice-extracted fruit material in water at a temperature of about 130° C. to about 165° C., thereby providing a four times-extracted fruit material and a proanthocyandin-rich extract and collecting the proanthocyandin-rich extract. The method further comprises treating the four times-extracted fruit material in a fifth extraction by immersing the four times-extracted fruit material in water at a temperature of about 145° C. to about 200° C., thereby providing a five times-extracted fruit material and a phenol-rich extract and collecting the phenol-rich extract.

The first extraction can be performed in a vessel, and the second extraction and the third extraction can be performed in the same vessel or a different vessel. The vessel can be under a pressure of about 0 pounds per square inch (psi) to about 500 psi, or about 250 psi to about 1000 psi, during the first and second extractions, and the vessel can be under a pressure of about 100 psi to about 1000 psi, e.g., about 250 psi to about 1000 psi, during the third extraction. The first extraction can be performed in a vessel, and the second extraction, the third extraction, and the fourth extraction can be performed in the same or a different vessel. The vessel can be under a pressure of about 0 psi to about 500 psi, or about 250 psi to about 1000 psi, during the first and second extractions, the vessel can be under a pressure of about 100 psi to about 1000 psi, e.g., about 250 psi to about 1000 psi, during the third extraction, and the vessel can be under a pressure of about 100 psi to about 1500 psi, e.g., about 250 psi to about 1000 psi, during the fourth extraction. The first extraction is performed in a vessel, and the second extraction, the third extraction, the fourth extraction, and the fifth extraction can be performed in the same or a different vessel. The vessel can be under a pressure of about 0 psi to about 500 psi, or about 250 psi to about 1000 psi, during the first and second extractions, the vessel can be under a pressure of about 100 psi to about 1000 psi, e.g., about 250 psi to about 1000 psi, during the third extraction, the vessel can be under a pressure of about 100 psi to about 1500 psi, e.g., about 250 psi to about 1000 psi, during the fourth extraction, and the vessel can be under a pressure of about 500 psi to about 1500 psi, or about 250 psi to about 1000 psi, during the fifth extraction.

In further implementations, the first extraction is performed in a first vessel, the second extraction is performed in a second vessel, and the third extraction is performed in a third vessel. The first vessel can be under a pressure of about 0 psi to about 500 psi during the first extraction, the second vessel can be under a pressure of about 0 psi to about 500 psi, or about 250 psi to about 1000 psi, during the second extraction, and the third vessel can be under a pressure of about 100 psi to about 1000 psi, e.g., about 250 psi to about 1000 psi, during the third extraction. The first extraction can be performed in a first vessel, the second extraction can be performed in a second vessel, the third extraction can be performed in a third vessel, and the fourth extraction can be performed in a fourth vessel. The first vessel can be under a pressure of about 0 psi to about 500 psi during the first extraction, the second vessel can be under a pressure of about 0 psi to about 500 psi, or about 250 psi to about 1000 psi, during the second extraction, the third vessel can be under a pressure of about 100 psi to about 1000 psi, e.g., about 250 psi to about 1000 psi, during the third extraction, and the fourth vessel can be under a pressure of about 100 psi to about 1500 psi, e.g., about 250 psi to about 1000 psi, during the fourth extraction. The first extraction can be performed in a first vessel, the second extraction can performed in a second vessel, the third extraction can performed in a third vessel, the fourth extraction can be performed in a fourth vessel, and the fifth extraction can be performed in a fifth vessel. The first vessel can be under a pressure of about 0 psi to about 500 psi during the first extraction, the second vessel is under a pressure of about 0 psi to about 500 psi, or about 250 psi to about 1000 psi, during the second extraction, the third vessel can be under a pressure of about 100 psi to about 1000 psi, e.g., about 250 psi to about 1000 psi, during the third extraction, the fourth vessel can be under a pressure of about 100 psi to about 1500 psi, e.g., about 250 psi to about 1000 psi, during the fourth extraction, and the fifth vessel can be under a pressure of about 500 psi to about 1500 psi, or about 250 psi to about 1000 psi, during the fifth extraction. The ratio of water-to-fruit material is about 1:1 to about 8:1 in the first extraction, the second extraction, the third extraction, the fourth extraction, and/or the fifth extraction. The first extraction, the second extraction, or the third extraction can be performed in a countercurrent apparatus. The first extraction, the second extraction, the third extraction, the fourth extraction, and the fifth extraction can each be performed in a countercurrent apparatus. Collecting the extract comprises cooling the extract and recovering the extract. The fruit material can be a cranberry fruit, presscake, or pomace.

In some embodiments, a method for processing fruit material comprises optionally treating the fruit material in a first extraction by immersing the fruit material in water at a temperature of about 20° C. to about 50° C. and under a pressure of about 0 psi to about 500 psi, thereby providing a once-extracted fruit material and a juice extract; and collecting the juice extract, treating the fruit material or once-extracted fruit material in a second extraction by immersing the fruit material or once-extracted fruit material in a vessel with water at a temperature of about 40° C. to about 120° C., or about 90° C. to about 110° C., thereby providing a twice-extracted fruit material and an anthocyanin-rich extract, and collecting the anthocyanin-rich extract. In some implementations the method further comprises treating the twice-extracted fruit material in a third extraction by immersing the twice-extracted fruit material in water at a temperature of about 100° C. to about 145° C., or about 120° C. to about 140° C., thereby providing a thrice-extracted fruit material and a pectin-rich extract and collecting the pectin-rich extract. In some implementations the method further comprises treating the thrice-extracted fruit material in a fourth extraction by immersing the thrice-extracted fruit material in water at a temperature of about 130° C. to about 165° C., thereby providing a four times-extracted fruit material and a proanthocyandin-rich extract and collecting the proanthocyandin-rich extract. The method further comprises treating the four times-extracted fruit material in a fifth extraction by immersing the four times-extracted fruit material in water at a temperature of about 145° C. to about 200° C., thereby providing a five times-extracted fruit material and a phenol-rich extract and collecting the phenol-rich extract. In some implementations the first extraction, the second extraction, the third extraction, the fourth extraction, and the fifth extraction are performed in the same vessel. The vessel can be under a pressure of about 0 psi to about 500 psi, or about 250 psi to about 1000 psi, during the second extraction, the vessel can be under a pressure of about 100 psi to about 1000 psi, e.g., about 250 psi to about 1000 psi, during the third extraction, the vessel can be under a pressure of about 100 psi to about 1500 psi, e.g., about 250 psi to about 1000 psi, during the fourth extraction, and the vessel can be under a pressure of about 500 psi to about 1500 psi, or about 250 psi to about 1000 psi, during the fifth extraction. The second extraction can be performed in a second vessel, the third extraction can be performed in a third vessel, the fourth extraction can be performed in a fourth vessel, and the fifth extraction can be performed in a fifth vessel. The second vessel can be under a pressure of about 0 psi to about 500 psi, or about 250 psi to about 1000 psi, during the second extraction, the third vessel can be under a pressure of about 100 psi to about 1000 psi, e.g., about 250 psi to about 1000 psi, during the third extraction, the fourth vessel can be under a pressure of about 100 psi to about 1500 psi, e.g., about 250 psi to about 1000 psi, during the fourth extraction, and the fifth vessel is under a pressure of about 500 psi to about 1500 psi, or about 250 psi to about 1000 psi, during the fifth extraction. The ratio of water-to-fruit material is about 1:1 to about 8:1 in the first extraction, the second extraction, the third extraction, the fourth extraction, and/or the fifth extraction. The first extraction, the second extraction, the third extraction, the fourth extraction, and/or the fifth extraction are performed in a countercurrent apparatus. Collecting the extract comprises cooling the extract and recovering the extract. The fruit material can be a cranberry fruit, presscake, or pomace.

In further embodiments, a method for processing fruit material comprises treating the fruit material in a first extraction by immersing the fruit material in a vessel with water at a temperature of about 100° C. to about 145° C., or about 120° C. to about 140° C., and under a pressure of about 100 psi to about 1000 psi, e.g., about 250 psi to about 1000 psi, thereby providing a once-extracted fruit material and a pectin-rich extract; and collecting the pectin-rich extract. In further implementations the method further comprises treating the once-extracted fruit material in a second extraction by immersing the once-extracted fruit material in water at a temperature of about 130° C. to about 165° C., thereby providing a twice-extracted fruit material and a proanthocyandin-rich extract; and collecting the proanthocyandin-rich extract. The method further comprises treating the twice-extracted fruit material in a third extraction by immersing the twice-extracted fruit material in water at a temperature of about 145° C. to about 200° C., thereby providing a thrice-extracted fruit material and a phenol-rich extract; and collecting the phenol-rich extract. The first extraction, the second extraction, and the third extraction can be performed in the same vessel. The vessel can be under a pressure of about 100 psi to about 1000 psi, e.g., about 250 psi to about 1000 psi, during the first extraction, the vessel is under a pressure of about 100 psi to about 1500 psi, e.g., about 250 psi to about 1000 psi, during the second extraction, and the vessel is under a pressure of about 500 psi to about 1500 psi, or about 250 psi to about 1000 psi, during the third extraction. The first extraction can be performed in a first vessel, the second extraction can be performed in a second vessel, and the third extraction can be performed in a third vessel. The first vessel can be under a pressure of about 100 psi to about 1000 psi, e.g., about 250 psi to about 1000 psi, during the first extraction, the second vessel can be under a pressure of about 100 psi to about 1500 psi, e.g., about 250 psi to about 1000 psi, during the second extraction, and the third vessel can be under a pressure of about 500 psi to about 1500 psi, or about 250 psi to about 1000 psi, during the third extraction. The ratio of water-to-fruit material is about 1:1 to about 8:1 in the first extraction, the second extraction, and/or the third extraction. The first extraction, the second extraction, and/or the third extraction are performed in a countercurrent apparatus. Collecting the extract comprises cooling the extract and recovering the extract. The fruit material can be a cranberry fruit, presscake, or pomace.

Some embodiments include a method for processing fruit material comprising treating the fruit material in a first extraction by immersing the fruit material in a vessel with water at a temperature of about 130° C. to about 165° C. and under a pressure of about 100 psi to about 1500 psi, e.g., about 250 psi to about 1000 psi, thereby providing a once-extracted fruit material and a proanthocyandin-rich extract; and collecting the proanthocyandin-rich extract. The method further comprises treating the once-extracted fruit material in a second extraction by immersing the once-extracted fruit material in water at a temperature of about 145° C. to about 200° C., thereby providing a twice-extracted fruit material and a phenol-rich extract; and collecting the phenol-rich extract. In some implementations, the first extraction and the second extraction are performed in the same vessel. The vessel can be under a pressure of about 100 psi to about 1500 psi, e.g., about 250 psi to about 1000 psi, during the first extraction, and the vessel can be under a pressure of about 500 psi to about 1500 psi, or about 250 psi to about 1000 psi, during the second extraction. The first extraction can be performed in a first vessel, and the second extraction can be performed in a second vessel. The first vessel can be under a pressure of about 100 psi to about 1500 psi, e.g., about 250 psi to about 1000 psi, during the first extraction, and the second vessel can be under a pressure of about 500 psi to about 1500 psi, or about 250 psi to about 1000 psi, during the second extraction. The ratio of water-to-fruit material is about 1:1 to about 8:1 in the first extraction and/or the second extraction. The first extraction and/or the second extraction are performed in a countercurrent apparatus. Collecting the extract comprises cooling the extract and recovering the extract. The fruit material can be a cranberry fruit, presscake, or pomace.

Further embodiments include a method for processing fruit material comprising treating the fruit material in an extraction by immersing the fruit material in a vessel with water at a temperature of about 145° C. to about 200° C. and under a pressure of about 500 psi to about 1500 psi, or about 250 psi to about 1000 psi, thereby providing an extracted fruit material and a phenol-rich extract; and collecting the phenol-rich extract. In some implementations the ratio of water-to-fruit material is about 1:1 to about 8:1 in the extraction. The extraction is performed in a countercurrent apparatus. Collecting the phenol-rich extract comprises cooling the extract and recovering the extract. The fruit material can be a cranberry fruit, presscake, or pomace.

In any of the methods described herein, the methods can be performed in a continuous process, semi-continuous process, or a batch process.

In another aspect, a system for processing fruit material is provided. The system can include a first chamber configured to immerse the fruit material in water at a first temperature and a first pressure and comprising one or more first chamber inlets for introducing the fruit material and water into the chamber, and further comprises a first extraction outlet in the first chamber that permits extracted liquid to flow from the first chamber and a first chamber outlet in the first chamber that permits once-extracted solids to flow from the first chamber. A second chamber fluidly connected to the first chamber outlet is configured to immerse the once-extracted solids exiting the first chamber in water at a second temperature and a second pressure, the second chamber comprising a second chamber inlet for introducing water into the second chamber, and further comprises a second extraction outlet in the second chamber that permits extracted liquid to flow from the second chamber and a second chamber outlet in the second chamber that permits permit twice-extracted solids to flow from the second chamber. In some embodiments a third chamber is fluidly connected to the second chamber outlet and configured to immerse the twice-extracted solids exiting the second chamber in water at a third temperature and a third pressure, the third chamber comprising a third chamber inlet for introducing water into the third chamber, and further comprises a third extraction outlet in the third chamber that permits extracted liquid to flow from the third chamber and a third remains outlet in the third chamber that permits thrice-extracted solids to flow from the third chamber.

In some embodiments the third temperature is different from the second temperature and the first temperature. The third pressure is different from the second pressure and the first pressure. The first, second, and third chambers are part of a countercurrent apparatus. The system comprises valves, pumps, and a controller configured to control the operation of the valves and pumps.

In some embodiments, a fourth or more chambers can be added to the system.

In another aspect, a countercurrent apparatus for processing fruit material is provided. The countercurrent apparatus can include an elongate trough-shaped housing inclined at an angle with a rotatable helical screw conveyor disposed therein and has a first chamber within the housing with a lower end and an upper end, the lower end having an inlet for the introduction of the fruit material into the chamber and an extraction outlet that permits extracted liquid to flow from the first chamber, the upper end having a charging line for introduction of water into the chamber and a chamber outlet that permits once-extracted solids to move from the first chamber. A second chamber is in fluid connection with to the first chamber, the second chamber having a lower end with an inlet for the introduction of the once-extracted solids into the second chamber from the chamber outlet of the first chamber and a second extraction outlet that permits extracted liquid to flow from the second chamber, the second chamber having an upper end with a charging line for introduction of water into the second chamber and a chamber outlet that permits twice-extracted solids to move from the first chamber. In some embodiments a third chamber is in fluid connection with the second chamber, the third chamber having a lower end with an inlet for the introduction of the twice-extracted material into the third chamber from the chamber outlet of the second chamber and a third extraction outlet that permits extracted liquid to flow from the third chamber, the third chamber having an upper end with a charging line for introduction of water into the third chamber and a chamber outlet that permits thrice-extracted solids to move from the third chamber. In further embodiments, a fourth chamber is included, e.g., connected to the third chamber, the fourth chamber having a lower end having an inlet for the introduction of the thrice-extracted material into the fourth chamber from the chamber outlet of the third chamber and a fourth extraction outlet that permits extracted liquid to flow from the fourth chamber, the fourth chamber having an upper end with a charging line for introduction of water into the fourth chamber and a chamber outlet that permits material to move from the fourth chamber.

In some embodiments each chamber is configured to maintain the solids and liquids therein at different pressures and at different temperatures. Each chamber is thermally isolated from each other. Each chamber is configured to maintain the solids and liquids therein at different temperatures. The apparatus is configured to permit gravity to wash liquid downwards through the apparatus. The helical screw conveyor is a single part that runs from the lower end of the lower chamber to the upper end of the third chamber. In further embodiments the first, second, and third chambers are formed within the same housing. In some embodiments the helical screw conveyor comprises an individual helical screw conveyor in each chamber and the helical screw conveyor in each chamber is rotatable at speeds independent from the speed of each other individual helical screw conveyor.

As used herein, the term "fruit material" refers to firm fruits, soft fruits, peeled, sliced, or scarified fruit, presscake, and/or pomace, which are well-known in the art, and described herein. In some instances, the fruit material can be cranberry, blueberry, grape, cherry, blackberry, raspberry, and/or apple, or any mixture thereof. Expression of juice from fruits such as cranberry, blueberry, and grape results in pressed skin, hulls, and seeds as a byproduct. These byproducts are rich in fiber and omega-3 fatty acids. This byproduct, often referred to as presscake or pomace, is suitable for processing in accordance with the present invention. Extracts produced from cranberries and cranberry presscake will be described herein, although skilled practitioners will appreciate that the methods may be modified to involve other types of fruit such as blueberries, grapes, and/or blackberries. The fruit to be treated can be a single kind of fruit or a mixture of different types of fruit.

"Firm fruit material" is fruit that resists structural collapse under substantial compression. Examples include cranberries, apples, cherries, and grapes. On the other hand, "soft fruits" are more readily collapsed. Examples include blueberries, raspberries, blackberries, and the meat of various fruits especially tropical fruits, e.g., kiwi, guava, mango, and passion. "Once-extracted fruit material" is whole fruit or fruit piece(s) that have been subjected to one extraction step such that at least or about 85%, e.g., at least or about 90%, 91%, 92%, 93%, 94%, 95%, 96%, 97%, 98%, or at least or about 99%, of the inherent soluble solids have been removed. "Twice-extracted fruit material" is whole fruit or fruit piece(s) that have been subjected to two extractions, such that at least or about 10%, e.g., at least or about 20%, 30%, 40%, 50%, 60%, 70%, 80%, 90%, 95%, 96%, 97%, 98%, or at least or about 99%, of the residual anthocyanins that were present in the once-extracted fruit feedstock have been removed. "Thrice-extracted fruit material" is whole fruit or fruit piece(s) that have been subjected to three extractions that allow at least about 5%, e.g., at least about 10%, 20%, 30%, 40%, 50%, 60%, 70%, 80%, 90%, 95%, 96%, 97%, 98%, or at least or about 99% of the pectin that was present in the twice-extracted fruit to be solubilized. "Four times-extracted fruit material" is whole fruit or fruit piece(s) that have been subjected to four extractions, such that at least or about 10%, e.g., at least or about 20%, 30%, 40%, 50%, 60%, 70%, 80%, 90%, 95%, 96%, 97%, 98%, or at least or about 99%, of the residual PACs that were present in the thrice-extracted fruit feedstock have been removed. "Five times-extracted fruit material" is whole fruit or fruit piece(s) that have been subjected to five extractions, such that at least or about 10%, e.g., at least or about 20%, 30%, 40%, 50%, 60%, 70%, 80%, 90%, 95%, 96%, 97%, 98%, or at least or about 99%, of the residual phenols that were present in the four times-extracted fruit feedstock have been removed. It will be understood that the processes of the claimed methods may achieve advantages such as improved yield, quality, and lower cost with many fruit materials. All percentages herein are by weight unless otherwise indicated or apparent.

Unless otherwise defined, all technical terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, and other references mentioned herein are incorporated by reference in their entirety. In case of conflict, the present specification, including definitions, will control.

Other features and advantages of the invention will be apparent from the following detailed description and figures, and from the claims.

DETAILED DESCRIPTION

Figure 1A:
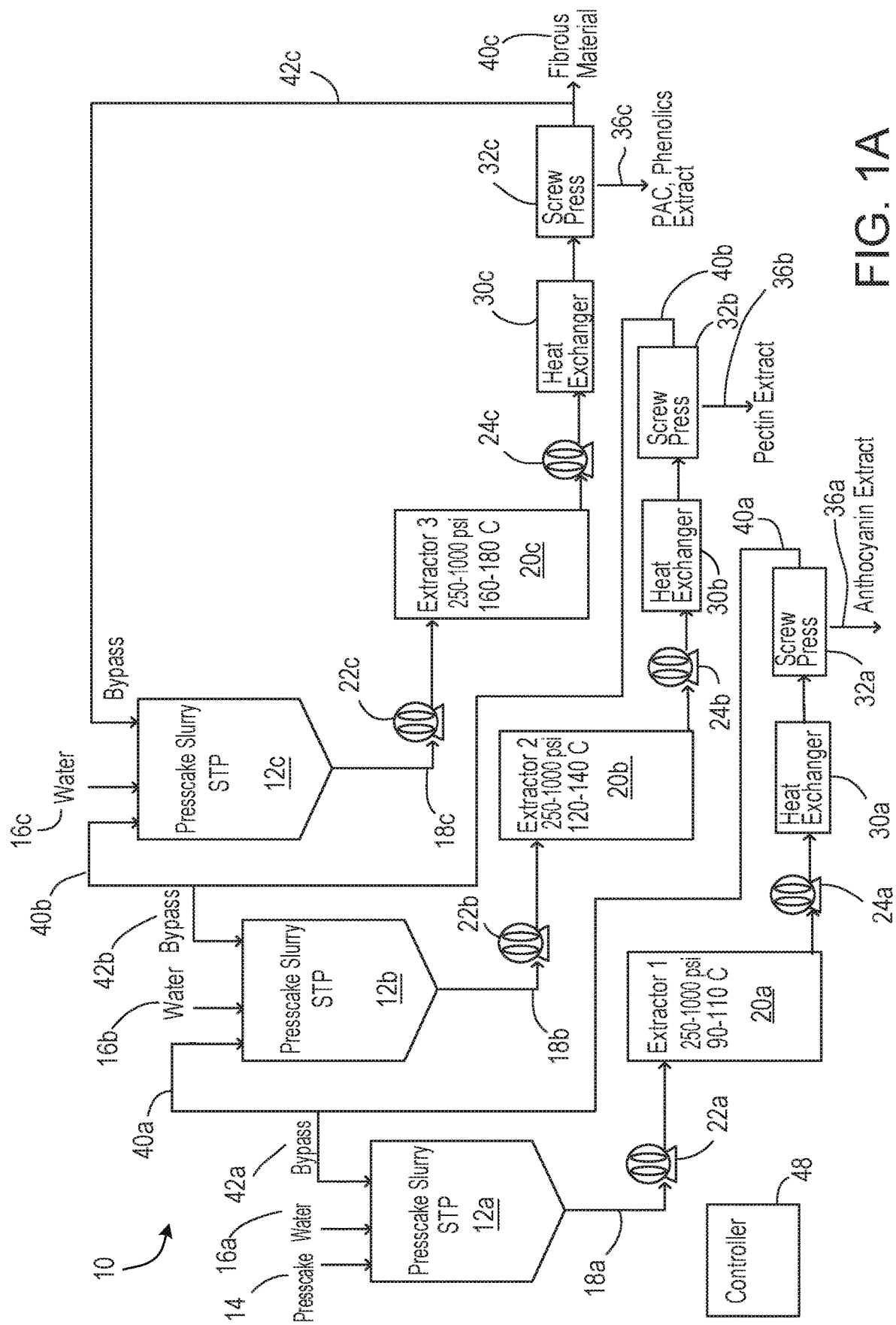
FIG. 1A is a drawing illustrating an exemplary continuous extraction apparatus and process.

Solvents that are "all natural" and environmentally-friendly are desired to process food, e.g., fruit material, to produce food products that have no additives. Water can often be too polar at room temperature to be effective for the extraction of organic compounds found in cranberries such as PACs and other phenolics; however, water can be changed from a highly polar solvent to a non-polar solvent by increasing its temperature. At temperatures and pressures lower than 374° C. and 3200 pounds per square inch (psi), subcritical water, also known as pressurized hot water, hot compressed water, near-critical water, and superheated water, has widely tunable properties, e.g., dielectric constant, surface tension, viscosity, and dissociation constant, that can be achieved by adjusting the temperature with a moderate pressure to keep water in the liquid state. When water is heated, its dielectric constant decreases and its ionic product increases such that at elevated temperatures, water acts like a weak polar organic solvent. For example, at 200° C., the dielectric constant of water is the same as that of room temperature methanol. At 297° C., benzene becomes completely miscible with water. Subcritical water is therefore a much better solvent for hydrophobic organics than ambient water. Thus, water at subcritical temperatures (100° C. to 374° C.) can be used as a "green" extraction liquid to replace hazardous solvents commonly used as organic modifiers and to extract many micronutrients that are left behind in cranberry hulls after juice has been extracted from cranberries.

Polarity of water can be controlled over a wide range of temperatures by heating it under a pressure of about 0 psi to about 1500 psi to maintain a liquid state, e.g., about 0 psi to about 500 psi, about 0 psi to about 1000 psi, about 100 psi to about 1500 psi, about 500 psi to about 1500 psi, about 250 psi to about 1000 psi, about 250 psi to about 500 psi, about 500 psi to about 800 psi, about 500 psi to about 1000 psi, about 500 psi to about 1500 psi, or about 1 psi, 5 psi, 10 psi, 25 psi, 50 psi, 75 psi, 100 psi, 125 psi, 150 psi, 175 psi, 200 psi, 225 psi, 250 psi, 275 psi, 300 psi, 325 psi, 350 psi, 375 psi, 400 psi, 425 psi, 450 psi, 475 psi, 500 psi, 525 psi, 550 psi, 575 psi, 600 psi, 625 psi, 650 psi, 675 psi, 700 psi, 725 psi, 750 psi, 775 psi, 800 psi, 825 psi, 850 psi, 875 psi, 900 psi, 925 psi, 950 psi, 975 psi, 1000 psi, 1050 psi, 1100 psi, 1150 psi, 1200 psi, 1250 psi, 1300 psi, 1350 psi, 1400 psi, or about 1450 psi. With temperature control up to 374° C., water can perform very selective extractions of polar, moderately polar, and nonpolar organic compounds. For example, the present disclosure provides a sequential five-step extraction process for preparing juice, anthocyanin-rich, pectin-rich, proanthocyanidin-rich, and phenol-rich extracts from fruit material. In a first extraction step performed at a lower temperature, e.g., about 20° C. to about 50° C., fruit material is subjected to extraction with water. This first extraction step removes the majority of the inherent soluble fruit component from the fruit material, e.g., sugars and acids, producing a juice extract. Optionally, the once-extracted fruit material or any fruit material can be subjected to a second extraction with water at a higher temperature, e.g., about 40° C. to about 120° C., or about 90° C. to about 110° C. This second extraction step removes anthocyanin, producing an anthocyanin-rich extract and a twice-extracted fruit material. Optionally, the twice-extracted fruit material or any fruit material can be subjected to a third extraction with water at a higher temperature, e.g., about 100° C. to about 145° C., or about 120° C. to about 140° C. This third extraction step removes pectin, producing a pectin-rich extract and a thrice-extracted fruit material. Optionally, the thrice-extracted fruit material or any fruit material can be subjected to a fourth extraction with water at a higher temperature, e.g., about 130° C. to about 165° C. This fourth extraction step removes proanthocyanidin, producing a proanthocyanidin-rich extract and a four times-extracted fruit material. Optionally, the four times-extracted fruit material or any fruit material can then be subjected to a fifth extraction with water at an even higher temperature, e.g., about 145° C. to about 200° C. This fifth extraction step removes other phenolic compounds, producing a phenol-rich extract and a five times-extracted fruit material. In any or in all of the extractions (e.g., one, two, three, four, or all five extractions), the extractions can be performed under a pressure of about 0 psi to about 1500 psi to maintain a liquid state, e.g., about 0 psi to about 500 psi, about 0 psi to about 1000 psi, about 100 psi to about 1500 psi, about 500 psi to about 1500 psi, about 250 psi to about 1000 psi, about 250 psi to about 500 psi, about 500 psi to about 800 psi, about 500 psi to about 1000 psi, about 500 psi to about 1500 psi, or about 1 psi, 5 psi, 10 psi, 25 psi, 50 psi, 75 psi, 100 psi, 125 psi, 150 psi, 175 psi, 200 psi, 225 psi, 250 psi, 275 psi, 300 psi, 325 psi, 350 psi, 375 psi, 400 psi, 425 psi, 450 psi, 475 psi, 500 psi, 525 psi, 550 psi, 575 psi, 600 psi, 625 psi, 650 psi, 675 psi, 700 psi, 725 psi, 750 psi, 775 psi, 800 psi, 825 psi, 850 psi, 875 psi, 900 psi, 925 psi, 950 psi, 975 psi, 1000 psi, 1050 psi, 1100 psi, 1150 psi, 1200 psi, 1250 psi, 1300 psi, 1350 psi, 1400 psi, or about 1450 psi, for one, two, three, four, five, or ten cycles, for about one, two, three, four, five, six, seven, eight, nine, or ten minutes each. For example, an extraction can be performed at about 0 psi for about 30 minutes, about 500 psi for about 1 minute, about 1000 psi for about 3 minutes, or about 1500 psi for about 5 minutes, for about one, two, or three cycles.

Continuous and Batch Processing Apparatus

Modified versions of commercially available countercurrent apparatuses, e.g., as described in US 2008/0251454 and U.S. Pat. Nos. 5,320,861 and 5,419,251, can be used in the process. Countercurrent extractors can include a screw conveyor, which advances fruit solids under pressure in a first direction while extraction liquid, e.g., water, flows in the opposite direction, extracting juice from the solids. However, it will be understood by skilled practitioners that other types of extractors may also be used in the process. The process will be described for use with cranberries, although it may be adapted for use with other fruit, such as blueberries.

The trough temperature may be controlled using any means known to skilled practitioners, e.g., by heating with a circulating water jacket positioned about the trough. Alternatively or in addition, one may control temperature by controlling the temperature of the fruit material and/or extraction liquid prior to introduction to the extractor. The screw conveyor is optionally operated by intermittently reversing the direction of rotation of the screw. The reversal helps the relatively compacted mass of matter being extracted to be opened up enhancing the penetration of extracting liquid.

An exemplary apparatus for continuous extraction in shown in FIG. 1A. In some embodiments, the continuous extractor apparatus 10 has multiple inter-connected sections, e.g., two, three, four, or five sections that can be operated at different temperatures and/or pressures. As shown in FIG. 1A, the exemplary countercurrent apparatus 10 has three compartments with three slurry tanks 12a, 12b, 12c. Each slurry tank 12a, 12b, 12c is connected to a series of fluid connections (pipes connected to the tanks 12a, 12b, 12c with appropriate pipes, valves, and pumps) such that liquids, or liquids combined with solids, can be delivered to or removed from each tank 12a, 12b, 12c. Each slurry tank 12a, 12b, 12c is also connected to various mechanisms that control the temperature and pressure inside each tank (not shown) such the pressure and temperature inside each slurry tank 12a, 12b, 12c can be held at a desired temperature and pressure, e.g., standard temperature and pressure (STP). The temperature and pressure of each slurry tank 12a, 12b, 12c can be different from each of the other tanks, two of the slurry tanks can have the same temperature and pressure, or all three tanks can have the same temperature and pressure.

The slurry tanks 12a, 12b, 12c of the continuous extractor apparatus 10 are arranged in series. In this arrangement, solid material (e.g., cranberries or presscake) are introduced into the first slurry tank 12a via a tank inlet 14. The slurry tanks 12a, 12b, 12c are separated by tank outlet lines 18a, 18b, 18c through which the solids are conveyed from one tank to the next. In some embodiments, to ensure that pressure, temperature, and fluid separation is maintained at a desired level between each slurry tank 12a, 12b, 12c, tank outlet lines 18a, 18b, 18c can open and close to fluidly connect and disconnect adjacent sections. This can be done by valves, or by other means as is known in the art. In some instances, the valves can be one-way valves.

A charging line 16a, 16b, 16c is provided for charging extraction liquid (e.g., water) into each slurry tank 12a, 12b, 12c and the tank outlet lines 18a, 18b, 18c provide for the discharge of liquid extract, e.g., a mixture of extraction liquid and/or soluble fruit solids from each slurry tank. The charging lines 16a, 16b, 16c and tank outlet lines 18a, 18b, 18c are shown as positioned at the top and bottom of the slurry tanks, respectively, but other arrangements are also possible.

In some embodiments, a pump 22a, 22b, 22c is positioned along each of the tank outlet lines 18a, 18b, 18c. The pumps, e.g., positive displacement pumps, pump fluid from the slurry tank 12a, 12b, 12c into extraction chambers 20a, 20b, 20c. Extraction chambers can be e.g., vessel or screw extractors. Exit pumps 24a, 24b, 24c, e.g., positive displacement pumps, are positioned along tank outlet lines 18a, 18b, 18c after each extraction chamber 20a, 20b, 20c to evacuate fluid from each respective extraction chamber. The extraction chambers 20a, 20b, 20c can maintain the slurry exiting from slurry tanks 12a, 12b, 12c at a different temperature and/or pressure than in the slurry tanks (e.g., at elevated temperature and pressure compared to STP in the slurry tanks). The temperature and pressure may be controlled using any means known to skilled practitioners. Tank outlet lines 18a, 18b, 18c exit each extractor chamber and continue to heat exchangers 30a, 30b, 30c, and then to screw presses 32a, 32b, 32c.

Each screw press 32a, 32b, 32c has at least two outlet lines, including extraction outlets 36a, 36b, 36c, and screw press lines 40a, 40b, 40c. The first screw press line 40a is fluidly connected to the second fluid slurry tank 12b and serves as an inlet to the second tank 12b. The first screw press line also includes tank return bypass line 42a, which is fluidly connected back to the first slurry tank 12a. The second screw press line 40b is fluidly connected to the third fluid slurry tank 12c and serves as an inlet to the third tank 12c. The second screw press line 40b also includes tank return bypass line 42b, which is fluidly connected back to the second slurry tank 12b. The third screw press line 40c exits the continuous extractor apparatus, and tank return bypass line 42c branches from the third screw press line 40c to fluidly connect back to the third slurry tank 12c.

In operation, berries or presscake are introduced to the continuous extractor apparatus 10 via the tank inlet 14 into slurry tank 12a and mixed with water at a first temperature (and/or pressure) introduced by charging line 16a. In some embodiments, the temperature and/or pressure of the slurry tank 12a can be controlled after the materials are introduced into it. After a predetermined time, the mix of presscake and water is pumped along tank outlet line 18a by pump 22a and introduced to the first extraction chamber 20a. The fluid is maintained in the extraction chamber at a desired temperature, e.g., about 90° C. to about 110° C., e.g., about 100° C., and a desired pressure, e.g., about 250 psi to about 1000 psi, e.g., about 500 psi, for a desired time e.g., about 1 minute to about 10 minutes, e.g., about 3 minute to about 9 minutes. The exit pump 24*a* then removes the fluid from the first extraction chamber 20*a* to pass through the first heat exchanger 30*a* and enter the first screw press 32*a*. Liquid containing the desired compound (e.g., anthocyanin extract) is removed via the extraction outlet 36*a* and the remaining solids are pumped along the first screw press line 40*a* into the second slurry tank 12*b*. If desired, the remaining solids can be diverted along the first tank return bypass line 42*a* to re-enter the first slurry tank 12*a*.

The materials introduced to the second slurry tank 12*b* are mixed with water at a first temperature (and/or pressure) introduced by the second charging line 12*b*. After a predetermined time, the mix of solids and water is pumped along tank the second outlet line 18*b* by the pump 22*b* and introduced to the second extraction chamber 20*b*. The fluid is maintained in the extraction chamber at a desired temperature, e.g., about 120° C. to about 140° C., and a desired pressure, e.g., about 250 psi to about 1000 psi, e.g., about 500 psi, for a desired time e.g., about 1 minute to about 10 minutes, e.g., about 3 minute to about 9 minutes. The exit pump 24*b* then removes the fluid from the second extraction chamber 20*b* to pass through the second heat exchanger 30*b* and enter the second screw press 32*b*. Liquid containing the desired compound (e.g., pectin extract) is removed via the second extraction outlet 36*b* and the remaining solids are pumped along the second screw press line 40*b* into the third slurry tank 12*c*. If desired, the remaining solids can be diverted along the second tank return bypass line 42*b* to re-enter the second slurry tank 12*b*.

The materials introduced to the third slurry tank 12*c* are mixed with water at a desired temperature (and/or pressure) introduced by the third charging line 12*c*. After a predetermined time, the mix of solids and water is pumped along the third outlet line 18*c* by the pump 22*c* and introduced to the third extraction chamber 20*c*. The fluid is maintained in the extraction chamber at a desired temperature, e.g., about 160° C. to about 180° C., and a desired pressure, e.g., about 250 psi to about 1000 psi, e.g., about 500 psi, for a desired time e.g., about 1 minute to about 10 minutes, e.g., about 3 minute to about 9 minutes. The exit pump 24*c* then removes the fluid from the third extraction chamber 20*c* to pass through the third heat exchanger 30*c* and enter the third screw press 32*c*. Liquid containing the desired compound (e.g., PAC and/or phenolics extract) is removed via the third extraction outlet 36*c* and the remaining solids are pumped along the third screw press line 40*c* to exit the continuous extractor apparatus 10. If desired, the remaining solids can be diverted along the third tank return bypass line 42*c* to re-enter the third slurry tank 12*c*.

A controller 48 can control the speed of the pumps, the opening and closing of the various valves, and the dwell time of the solid/liquid mix in the slurry tanks 12*a*, 12*b*, 12*c*, and the extraction chambers 20*a*, 20*b*, 20*c*. The controller 48 can also control the pressurization and temperature controllers for the slurry tanks 12*a*, 12*b*, 12*c*, the extraction chambers 20*a*, 20*b*, 20*c*, and the heat exchangers 30*a*, 30*b*, 30*c*.

The controller 48 coordinates the flow of solids and liquid through the continuous extractor apparatus 10. In some embodiments the solids and liquids are allowed to pass in a continuous series from the first to the second to the third section and then allowed to exit the continuous extractor apparatus 10. In other embodiments, the controller 48 can divert the flow paths along tank return bypass lines 42*a*, 42*b*, 42*c*. The solids introduced at the tank inlet 14 can be diverted back into the first slurry tank 12*a* one or more times. Similarly, the solids can be diverted back into the second slurry tank 12*b* one or more times and can be diverted back into the third slurry tank 12*c* one or more times. For example, if a pectin extract is considered of greatest importance for a particular application, the second tank return bypass line 42*b* can divert material so that liquid and solids move through the second section and through the second screw press 32*b* multiple (e.g., two, three, or more) times, while the first and third tank return bypass lines 42*a* and 42*c* are not used and material flows through the first and third sections only once.

In some embodiments filters are located extraction outlets 36*a*, 36*b*, 36*c*. Solids collected at these filters can be returned to the tank inlet 14 and re-introduced to the continuous extractor apparatus 10.

In some embodiments the heat exchangers 30*a*, 30*b*, 30*c* are not included.

In some embodiments each set of pump, extraction chamber, and exits pumps (e.g., 22*a*, 20*a*, 24*a*) can be replaced by an extruder, for example a single or twin screw extruder.

Figure 1B:
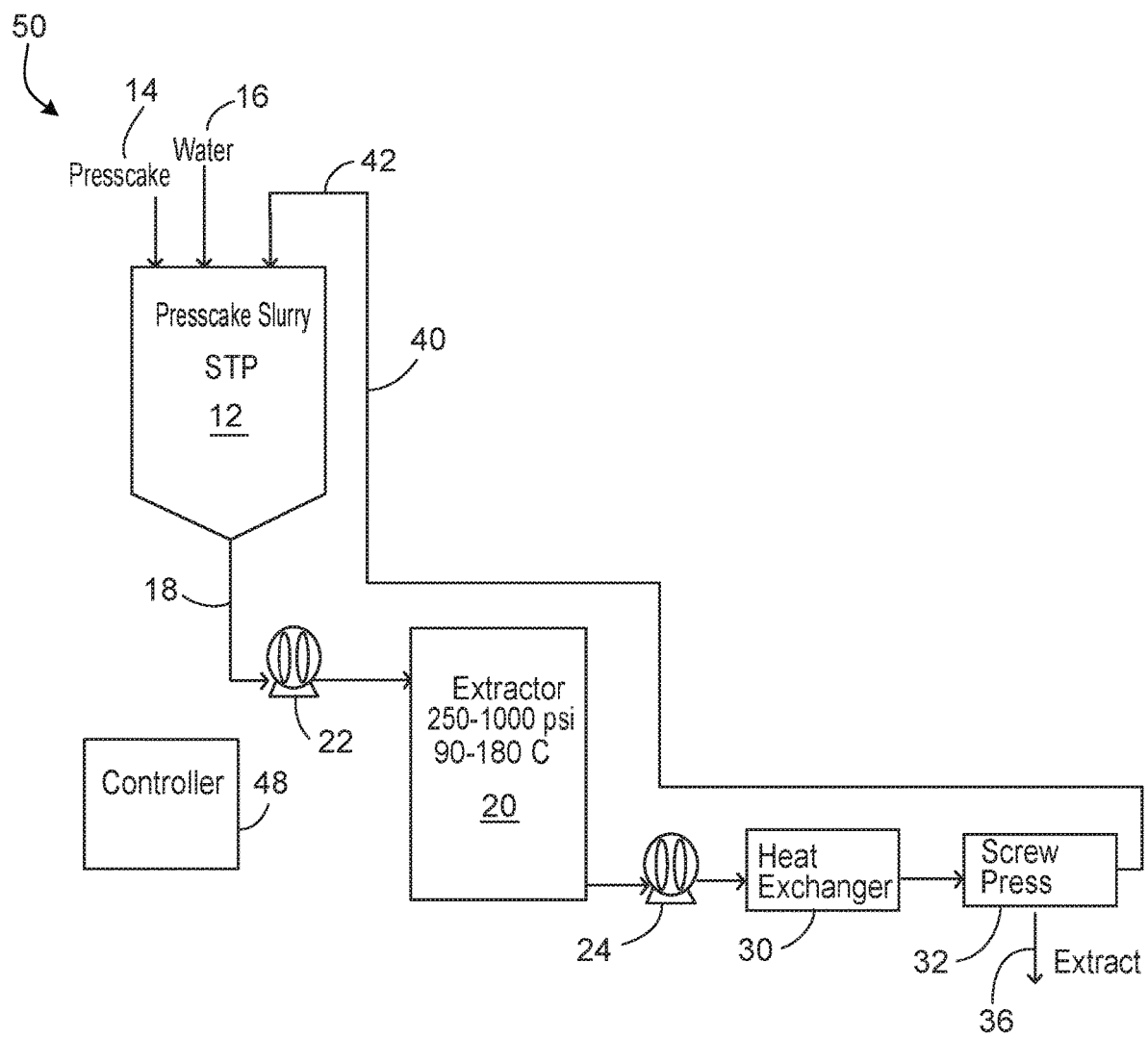
FIG. 1B is a drawing illustrating an exemplary batch extraction apparatus and process.

An exemplary apparatus for batch extraction in shown in FIG. 1B. Elements of the batch extractor apparatus 50 which are the same as the continuous extractor apparatus 10 have the same reference numbers without letters a, b, c to indicate that there is only one of each element in the batch extractor apparatus 50.

In operation, berries or presscake are introduced to the batch extractor apparatus 50 via the tank inlet 14 into slurry tank 12 and mixed with water at a first temperature (and/or pressure) introduced by charging line 16. After a predetermined time, the mix of solids and water is pumped along an outlet line 18 by a pump 22 and introduced to the extraction chamber 20. The fluid is maintained in the extraction chamber at a desired temperature, e.g., about 90° C. to about 100° C., and a desired pressure, e.g., about 250 psi to about 1000 psi, e.g., about 500 psi, for a desired time e.g., about 1 minute to about 10 minutes, e.g., about 3 minute to about 9 minutes. The exit pump 24 then removes the fluid from the extraction chamber 20 to pass through the heat exchanger 30 and enter the screw press 32. Liquid containing the desired compound (e.g., anthocyanin extract) is removed via the extraction outlet 36 and the remaining solids are pumped along the screw press line 40 and the tank return line 42 to return to the slurry tank 12.

If desired, the same process steps at the same conditions are repeated to extract more of the same extract (e.g., anthocyanin extract). Additionally or alternatively, the fluid is maintained in the extraction chamber 20 at a different temperature, e.g., 120-140° C., and a desired pressure, e.g., 250-1000 psi, e.g., 500 psi, for a desired time and liquid containing the desired compound (e.g., pectin extract) is removed via the extraction outlet 36 and the remaining solids are pumped along the screw press line 40 and the tank return line 42 to return to the slurry tank 12. Additionally or alternatively, the fluid is maintained in the extraction chamber 20 at a different temperature, e.g., 160° C. to about 180° C., and a desired pressure, e.g., about 250 psi to about 1000 psi, e.g., about 500 psi, for a desired time and liquid containing the desired compound (e.g., PAC and phenolics extract) is removed via the extraction outlet 36 and the remaining solids are pumped along the screw press line 40 and the tank return line 42 to return to the slurry tank 12. The fully extracted solids exit the batch extractor apparatus 50 via the screw press line 40.

A controller 48 can control the speed of the pumps, the opening and closing of the various valves, and the dwell time of the solid/liquid mix in the slurry tank 12 and the extraction chamber 20. The controller 48 can also control the pressurization and temperature controllers for the slurry tanks 12, the extraction chambers 20, and the heat exchangers 30.

Countercurrent Apparatus

Modified versions of commercially available countercurrent apparatuses, e.g., as described in US 2008/0251454 and U.S. Pat. Nos. 5,320,861 and 5,419,251, can be used in the process. Countercurrent extractors can include a screw conveyor, which advances fruit solids under pressure in a first direction while extraction liquid, e.g., water, flows in the opposite direction, extracting juice from the solids. However, it will be understood by skilled practitioners that other types of extractors may also be used in the process. The process will be described for use with cranberries, although it may be adapted for use with other fruit, such as blueberries.

Figure 2A:
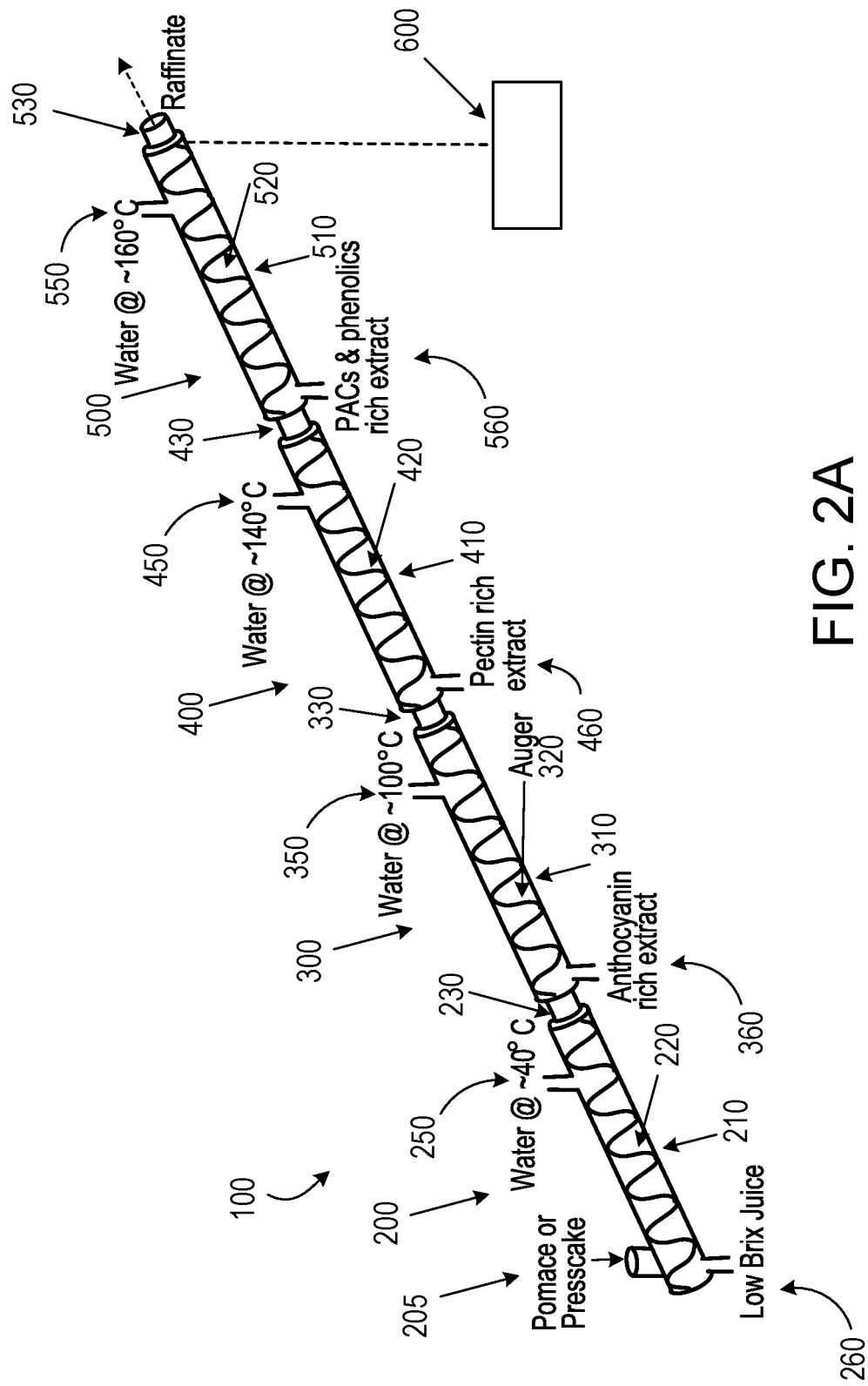
FIG. 2A is a drawing illustrating an exemplary countercurrent extraction apparatus.

An exemplary countercurrent apparatus useful as an extractor includes an airtight elongate trough-shaped housing inclined at an angle with a helical screw conveyor either continuously or intermittently rotated by a motor means, connected to a shaft on its longitudinal axis (FIG. 2A). In some embodiments, the exemplary countercurrent apparatus shown in FIG. 2A can we used with the processes described above with respect to FIG. 1A.

In some embodiments, the apparatus has multiple interconnected compartments, e.g., two, three, four, or five compartments that can be operated at different temperatures and/or pressures. As shown in FIG. 2A, the exemplary countercurrent apparatus 100 has four compartments 200, 300, 400, 500. Each compartment 200, 300, 400, 500 has a housing 210, 310, 410, 510 that surrounds a helical screw conveyor or auger 220, 320, 420, 520. Each auger 220, 320, 420, 520 within its respective housing 210, 310, 410, 510 conveys solid material upwards along the length of the housing 210, 310, 410, 510 and can be controlled to turn at speeds independent of the other augers, or to turn or not turn independently of the other augers. The solid (e.g., cranberries or presscake) being conveyed upwards is subject to countercurrent flow that washes over the solids and flows downwards due to gravity. The clearance between each housing 210, 310, 410, 510 and auger 220, 320, 420, 520 is such that liquid, but not solid particulates, can flow between each housing 210, 310, 410, 510 and auger 220, 320, 420, 520. Each housing 210, 310, 410, 510 is configured such that it can maintain an elevated pressure within the housing at the desired level. The pressure levels can be the same or different between two or more of the housings 210, 310, 410, 510.

The compartments 200, 300, 400, 500 of the countercurrent apparatus 100 are arranged in series. In this arrangement, cranberries or presscake introduced into the first compartment 200 via an inlet 205 can be carried up and introduced to the second compartment 300, and subsequently the third and fourth compartments 400, 500. The compartments are separated by compartment connectors 230, 330, 430 through which the solids are conveyed from one compartment up to the next. In some embodiments, to ensure that pressure, temperature, and fluid separation is maintained at a desired level between each compartment 200, 300, 400, 500, the compartment connectors 230, 330, 430 can open and close to fluidly connect and disconnect adjacent compartments. This can be done by valves, or by other means as is known in the art.

Each housing 210, 310, 410, 510 has an inlet at the lower end of each compartment 200, 300, 400, 500 for the introduction of the fruit material to be extracted, e.g., raw cranberries. These inlets include compartment connectors 230, 330, 430 that allow the solids to move from one compartment to the next, and the inlet 205 at the lower end of the first compartment 200. Each compartment 200, 300, 400, 500 also has an outlet at the upper end for the removal of solid fruit material. The outlets include the compartment connectors 230, 330, 430, and a raffinate outlet 530 at the end of the fourth compartment 500.

A charging line 250, 350, 450, 550 is provided for charging extraction liquid into each compartment 200, 300, 400, 500 and a discharge line 260, 360, 460, 560 is provided for the discharge of liquid extract, e.g., a mixture of extraction liquid and/or soluble fruit solids from each compartment. A filter is positioned in each housing 210, 310, 410, 510 so as to be coincident with and lie along the housing at the position of each discharge line 260, 360, 460, 560. The filters have a mesh with openings sized such that liquid, but not solid particulates, can flow through the filters and along the discharge lines 260, 360, 460, 560 to exit the countercurrent apparatus 100. Additionally, valves can be located along the discharge line 260, 360, 460, 560 near the housing 210, 310, 410, 510. The valves can be controlled to be opened and closed. In some instances, the valves can be one-way valves. The charging lines 250, 350, 450, 550 and discharge lines 260, 360, 460, 560 can be positioned at the ends of the housings 210, 310, 410, 510, or at a distance from the ends. For example, the charging lines 250, 350, 450, 550 and discharge lines 260, 360, 460, 560 can be spaced from each other at a distance to minimize the amount of heat conducted from a higher compartment (e.g., hotter compartment), to a lower one. By way of example, charging line 250 and discharge line 360 can be separated so that water with extracted solutes leaving compartment 300 via discharge line 360 at a temperature of approximate 100° C. does not thermally interact (or minimally thermally interacts) with the water entering compartment 200 via charging lines 250 at 40° C.

The trough temperature may be controlled using any means known to skilled practitioners, e.g., by heating with a circulating water jacket positioned about the trough. Alternatively or in addition, one may control temperature by controlling the temperature of the fruit material and/or extraction liquid prior to introduction to the extractor. The screw conveyor is optionally operated by intermittently reversing the direction of rotation of the screw. The reversal helps the relatively compacted mass of matter being extracted to be opened up enhancing the penetration of extracting liquid.

In operation, berries or presscake are introduced at the inlet 205 and raised along the first compartment 200 while being counterwashed by water at a first temperature (and/or pressure) introduced at charging line 250. The resulting liquid (e.g., low brix juice) is extracted at discharge line 260 while the filter prevents solids from flowing through the discharge line 260. The solids (and any remaining clinging water) are then passed through compartment connector 230 to the second compartment 300. The process is repeated, with water at a second temperature introduced at inlet 350 rinsing the (previously rinsed) solids. This second liquid is extracted at outlet 360, and the twice-rinsed solids are passed through compartment connector 330. The same process occurs at the third compartment 400 and fourth compartment and after the fourth rinse the solids exit the countercurrent apparatus 100 at raffinate outlet 530.

In some embodiments, a pump is positioned along each of the discharge lines 260, 360, 460, 560. The pumps, e.g., positive displacement pumps, pump fluid from the compartments 200, 300, 400, 500 after the fluid has extracted the respective compounds from the solids. The pumps remove the enriched fluids from each respective compartment before the fluid crosses the compartment connector 230, 330, 430, and prevents loss of the desired extracted compound into the compartment, or compartments, below. By removing all, or nearly all, of the fluid at the given temperature for each compartment 200, 300, 400, 500, the pumps also prevent thermal contamination of the compartment, or compartments, below a given compartment.

To maximize the time during which each compartment is maintained at the desired temperature and/or pressure level for that compartment, in some embodiments the countercurrent apparatus can be attached to a controller 600 that coordinates the movements of the augers 220, 320, 420, 520 and the compartment connectors 230, 330, 430. The controller 600 can control the speed of the augers 220, 320, 420, 520, the opening and closing of the compartment connectors 230, 330, 430, inlet 205, raffinate outlet 530, and the valves. The controller can also control the pressurization and temperature controllers for each compartment 200, 300, 400, 500.

In further embodiments, the controller 600 coordinates the various components of the countercurrent apparatus 100 to ensure that the extracts and solids in the compartments 200, 300, 400, 500 are kept separate. Cranberries in solid form are introduced at inlet 205. Auger 220 operates to raise the berries along the first compartment 200 while heated water introduced at charging line 250 flows along the auger 220 and solids. Compartment connector 230 remains closed, causing the solids to build up in the housing 210 above the charging line 250 and below the compartment connector 230. The auger 220 is angled with respect to the housing 210 so as to ensure that any solids resting against the filter at discharge line 260 are swept up by the circulating auger 220. The valve at discharge line 260 can be open during the phase of the counterwashing to allow the liquid to exit through the discharge line 260 continuously. Alternatively the valve can be closed and opened at desired times during the operation of the countercurrent apparatus 100.

The compartment connector 230 is then opened and the solids collected at the top of the compartment 200 are passed through to the second compartment 300 by the turning of the first auger 220. The compartment connector 230 is closed after a predetermined amount of time (or number of turns of the auger 220). The solids introduced into the second compartment 300 are then raised by the second auger 320 and washed by fluid introduced at charging line 350 which is extracted at discharge line 360. The compartment connector 230 being closed ensures that this second fluid does not flow into the first compartment 200.

Concurrently, the first auger 220 is packing solids at the top of the first compartment 200. When a predetermined amount (as measure by e.g., time, or number of turns of the auger 220) of solids has been built up, the controller 600 will stop fluid from being introduced at the second charging line 350 and then once again open compartment connector 230 at allow a new batch of solids to be passed to the second compartment. Once through, both the charging lines 250 and 350 are opened to allow water to be introduced. This process continues until solids reach the top of the second compartment 300. At that time, the sequence is repeated for the second compartment connector 330, third auger 420 and third charging line 450. When solids reach the top of the third compartment 300, the third compartment connector 430, fourth auger 520 and fourth charging line 550 are also controlled as described. In this manner, solids can be introduced at the first compartment 205 and treated in series until they finally exit at raffinate outlet 530.

Figure 2B:
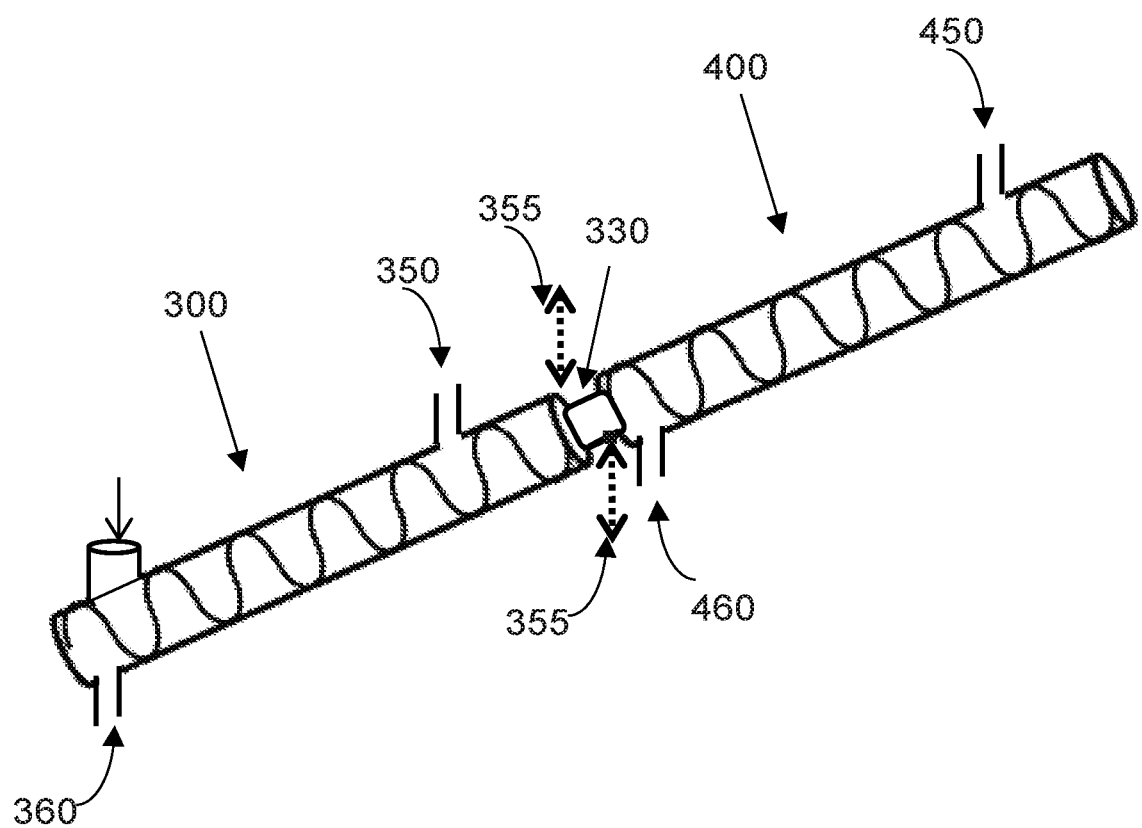
FIG. 2B is a drawing illustrating a portion of the exemplary countercurrent extraction apparatus.

Alternatively, a continuous flow of solids between chambers may be devised by rendering the augers 220, 320, 420, 520 tightly fitting against the walls of the housings 210, 310, 410, 510 at the section just above the charging lines 250, 350, 450, 550 and below the compartment connectors 230, 330, 430 and raffinate outlet 530. Similarly, the augers 220, 320, 420, 520 can fit tightly against the walls of the housings 210, 310, 410, 510 just below the discharge lines 260, 360, 460, 560. In some embodiments, the compartment connectors 230, 330, 430 are pressurized with a fluid. Referring to FIG. 2B, by way of example, compartments 300 and 400 are shown attached by connector 330. Connector 330 is configured such that fluid, e.g., water or subcritical water, indicated by arrows 355 can enter and leave the connector 330. The fluid has a slightly higher pressure than its respective upper and the lower compartments 300, 400. Air, nitrogen or carbon dioxide may also be used to pressurize the connector. The fluid 355 within the connector 330 keeps the water from either of the compartments 300, 400 from leaking into the connector 330. Compartment connectors 230, 430 as well as raffinate outlet 530 can be similarly configured.

Figure 2C:
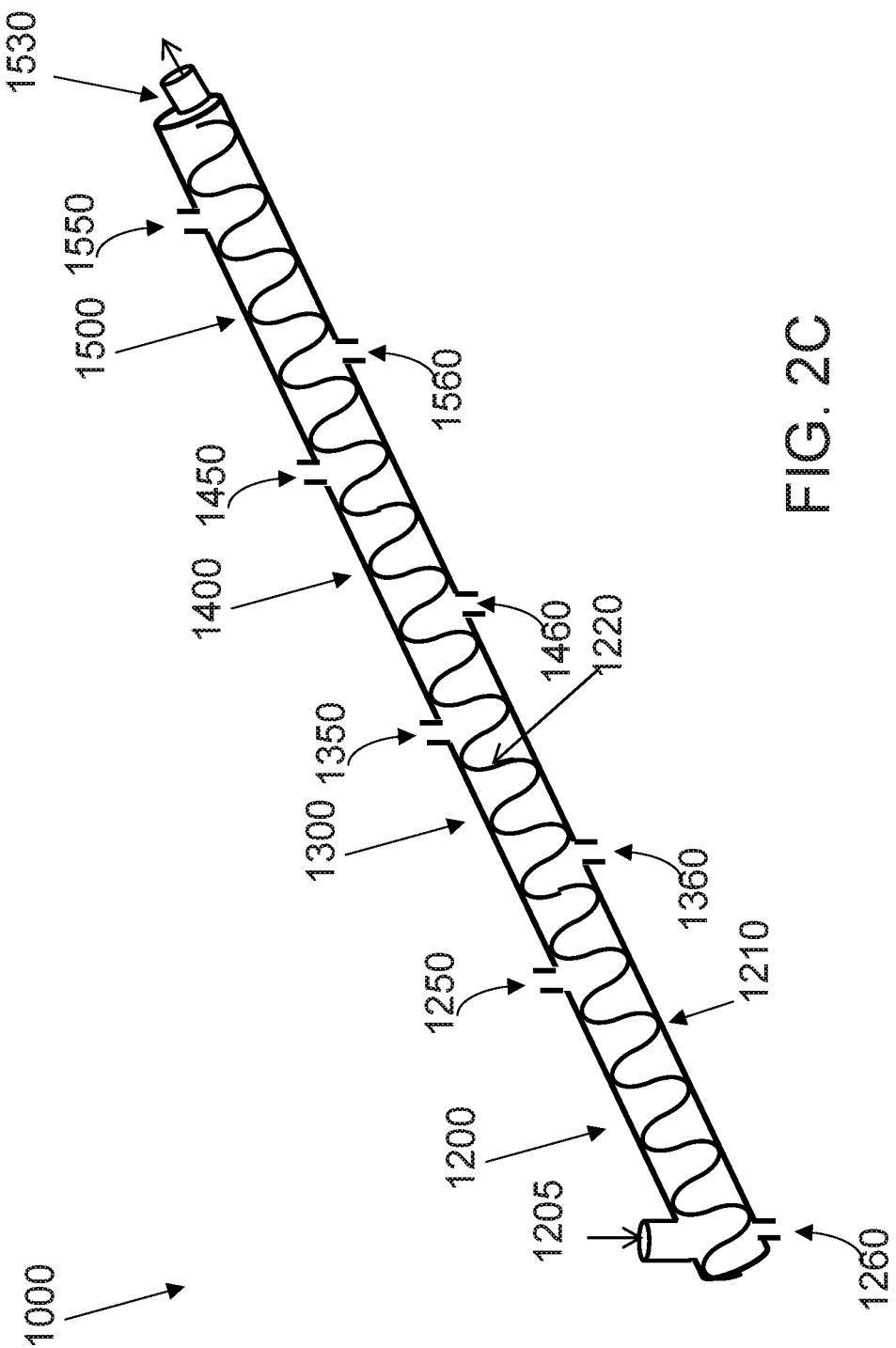
FIG. 2C is a drawing illustrating an additional embodiment of an exemplary continuous countercurrent extraction apparatus.
Figure 3:
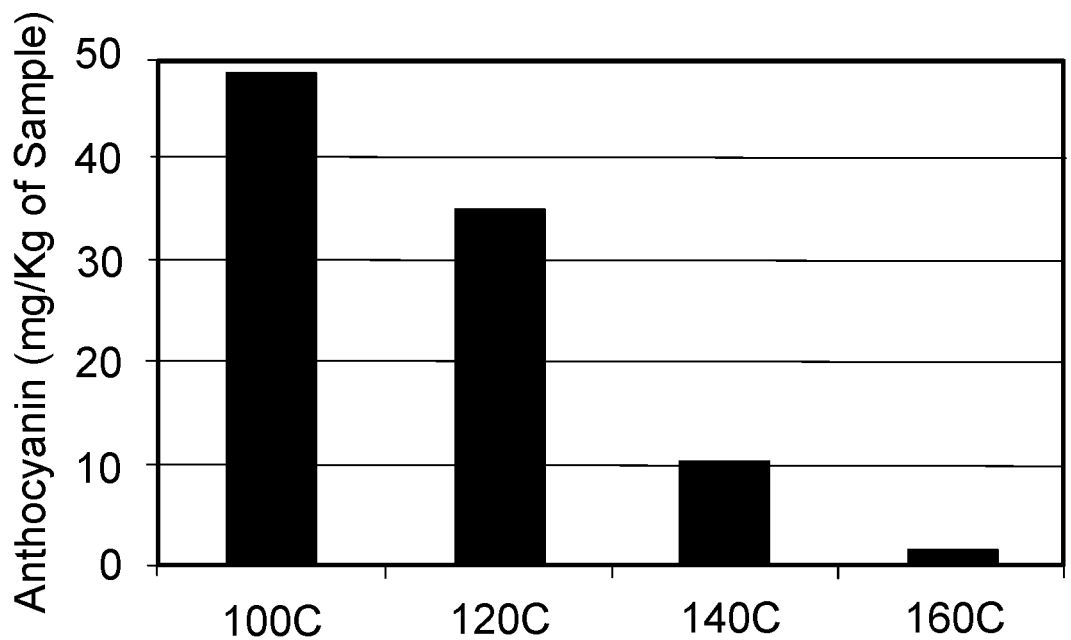
FIG. 3 is a bar graph showing optimal extraction of anthocyanin at about 100° C.
Figure 4:
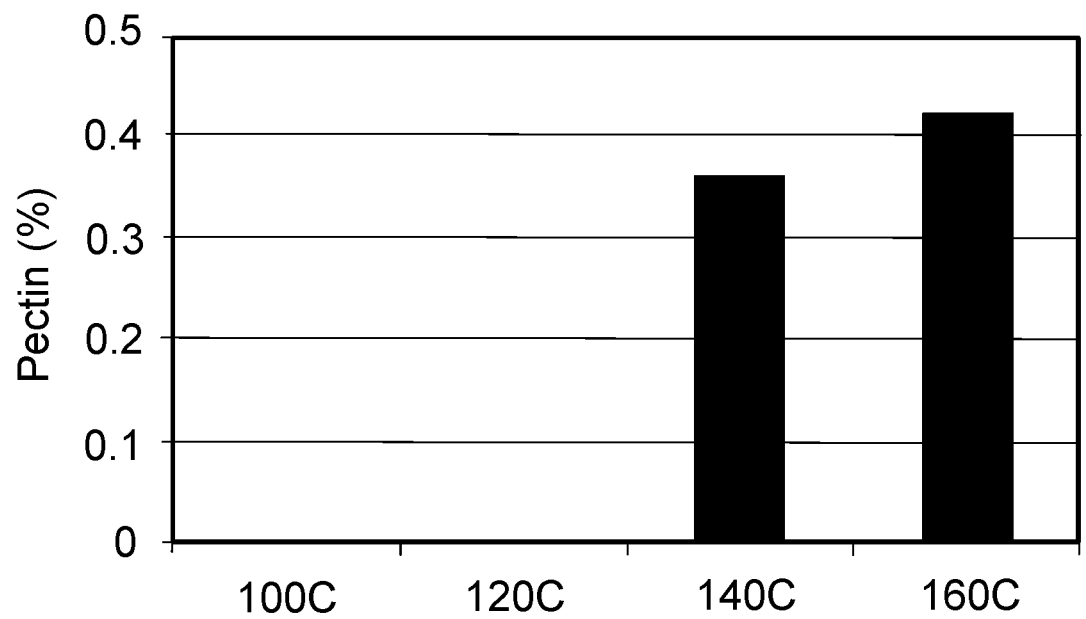
FIG. 4 is a bar graph showing optimal extraction of pectin at about 140° C.
Figure 5:
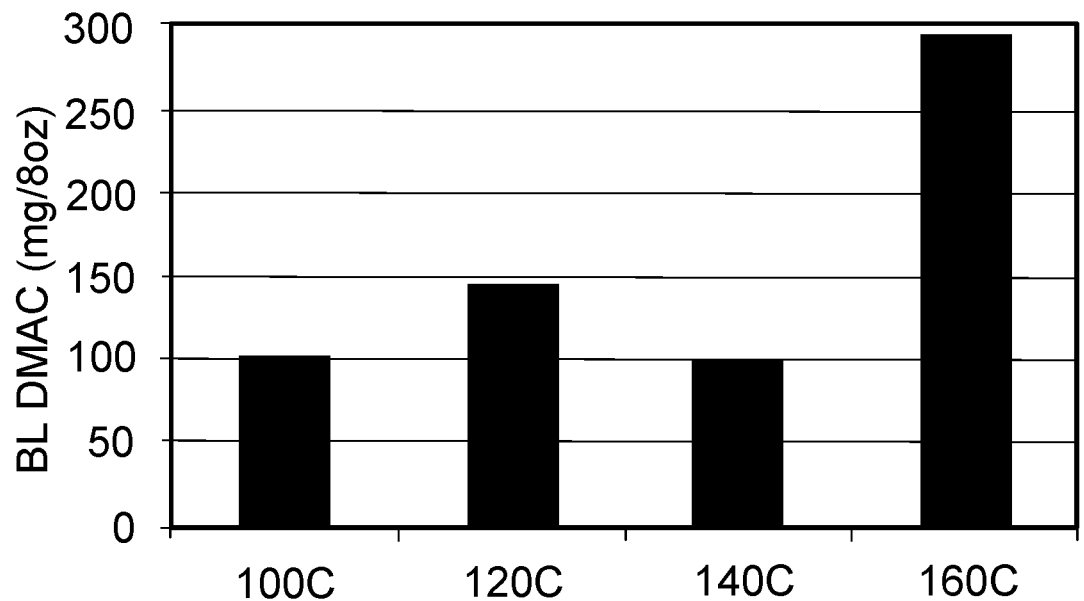
FIG. 5 is a bar graph showing optimal extraction of PACs at about 160° C.
Figure 6:
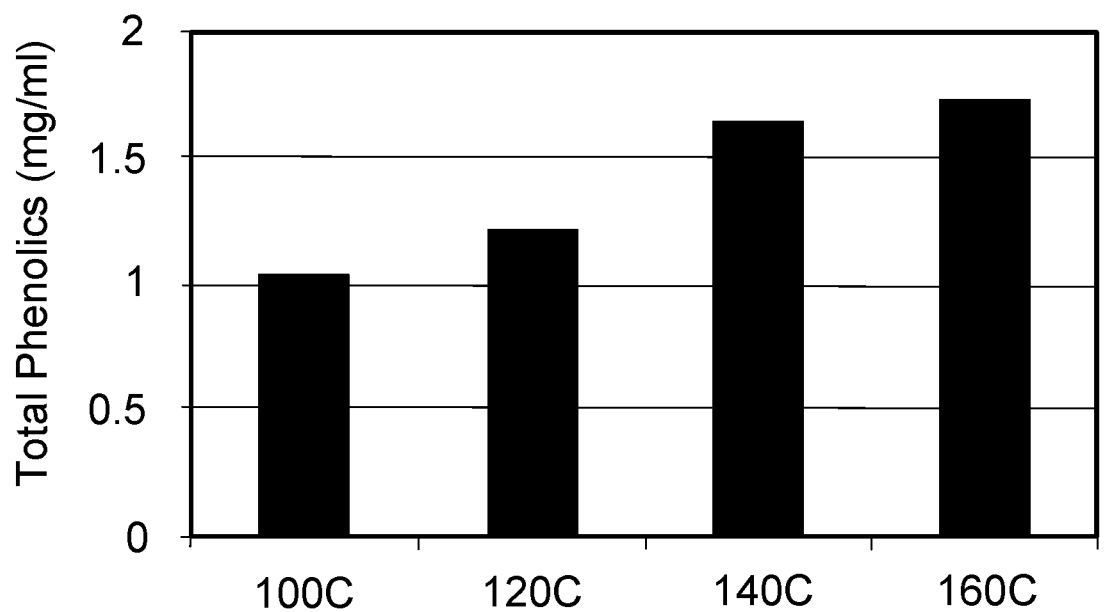
FIG. 6 is a bar graph showing optimal extraction of phenolic compounds at above 160° C.

Referring to FIG. 2C, in another embodiment, apparatus 1000 is a single unit with a full length auger 1220 that the spans the length of a single housing 1210 from an inlet 1205 to raffinate outlet 1530. Compartments 1200, 1300, 1400, 1500 are created by the auger 1220 blades that rotate around an inner wall of the housing 1210 without any gap for fluid to pass therebetween. This fit is particularly close between the charging lines 1250, 1350, 1450, 1550 of one compartment and the discharge lines 1260, 1360, 1460, 1560 of the next compartment, as well as the raffinate outlet 1530. The higher pressure of the subcritical water in an upper compartment (e.g., compartment 1300, 1400, 1500) prevents the fluid in the lower compartment (e.g., compartment 1200, 1300, 1400) from entering the upper compartment. The small leakage of the fluid from an upper compartment to a lower compartment does not significantly reduce the sequential extraction advantage.

In some embodiments additional filters are located at the far end of the discharge lines 260, 360, 460, 560. Solids collected at these additional filters can be returned to the inlet 205 and re-introduced to the countercurrent apparatus 100.

In some embodiments, the heated water has a tendency to compact the solids, especially at very high pressure conditions, preventing the water from penetrating the mass of cranberries or presscake. Augers 220, 320, 420, 520 that will withstand the high pressure without compacting the substrate may include spikes. The spikes may be located, for example, on an interior surface of the housing 210, 310, 410, 510. As the augurs 220, 320, 420, 520 rotate within the housing, the spikes encounter any clumped solids and break apart their mass.

Alternatively, the augurs may have raised surfaces with long spikes or baffles to resist the solids from compaction.

Alternatively, a meshed support can be attached to the augur 220, 320, 420, 520, or holes can be located along the augur blades. These holes can be sized for water to pass through and for solids to be retained, providing additional pathways for the fluid to travel along the length of the compartment. In some embodiments, one or more of these auger modifications can be used in combination.

The raw extract from an extractor stage liquid output can be further treated, e.g., as described in U.S. Pat. No. 5,320,861. Briefly, liquid output can be treated, first in a separation stage to remove and collect extraneous seeds and pulp solids at a collection stage. The extract can also be further treated in a depectinization stage in which pectinase enzyme is provided and mixed with the extract. The enzyme, e.g., in amounts between about 0.01 and 0.1 percent, clears the juice extract of pectin in preparation for a filtration stage. Filtration can be achieved by means of a microfilter of, e.g., 0.1 to 0.5 micron pore size, e.g., 0.2 micron. The filtered juice extract can be further treated at a reverse osmosis stage where the juice extract is passed through a membrane system under pressure to semi-concentrate the juice product to about 18° Brix. This semi-concentrated juice product can then be concentrated to a higher level (e.g., about 50° Brix) through evaporative concentration as the final juice product.

Juice Extraction

Extraction of juice from fruit material can be performed at a relatively low temperature. For example, the extraction can be performed at a temperature of about 20° C. to about 50° C., e.g., about 21° C., 22° C., 23° C., 24° C., 25° C., 26° C., 27° C., 28° C., 29° C., 30° C., 32° C., 35° C., 37° C., 40° C., 42° C., 45° C., 47° C., 48° C., 49° C., or at a temperature in a range between any two of the above-referenced values, under a pressure of about 0 psi to about 500 psi to maintain water in a liquid state, e.g., about 0 psi to about 100 psi, about 100 psi to about 250 psi, about 200 psi to about 400 psi, about 250 psi to about 500 psi, about 300 psi to about 500 psi, about 400 psi to about 500 psi, or about 1 psi, 5 psi, 10 psi, 25 psi, 50 psi, 75 psi, 100 psi, 125 psi, 150 psi, 175 psi, 200 psi, 225 psi, 250 psi, 275 psi, 300 psi, 325 psi, 350 psi, 375 psi, 400 psi, 425 psi, 450 psi, 475 psi, or about 500 psi. For example, the extraction can be performed in a range of about 20° C. to about 50° C., about 20° C. to about 30° C., about 22° C. to about 37° C., about 35° C. to about 40° C., about 37° C. to about 42° C., about 40° C. to about 45° C., about 42° C. to about 48° C., or about 45° C. to about 50° C. Skilled practitioners will appreciate that any art-known method and/or apparatus can be used to perform an extraction of juice in accordance with the present invention. For example, a countercurrent extractor, a vessel, and/or a tank system (e.g., as described in U.S. Pat. No. 6,440,483, which is incorporated by reference) can be employed in the juice extraction or the countercurrent apparatus described above may be used. In an exemplary juice extraction, whole raw fruit material, which has been bulk frozen, is provided to a cleaning stage to remove loose debris such as twigs, stems, leaves, soil, etc., and then conveyed to a sorting stage, which sorts fruit material to a selected size (e.g., a minimum size specification) and removes undesirable foreign material (e.g., wood fragments and metal clips). The size-selected fruit material is next passed to a slicer stage (e.g., Model CC, Urschel Laboratories, Inc., Valparaiso, Ind.), which slices the berries to expose the inner pulp of the fruit material unprotected by the skin, although other skin penetrating treatments such as scarifying may also be used. Alternatively, the fruit material can be presscake or pomace.

The sliced fruit material (e.g., at about −10° C.) optionally can be transported, for example by means of a flume, to a separation stage, which can include a vibratory shaker with perforated plates, to separate the sliced fruit material from the flume fluid (e.g., water; initially at about 45° C.). The thawed sliced fruit material (e.g., at about 18° C.) is then provided as solid input to a first extraction stage, which in this example employs a pressurized countercurrent apparatus described earlier. However, it will be understood by skilled practitioners that any means of extracting juice, e.g., using other extractors known in the art, may be used in the process. Moreover, freezing of the fruit material prior to processing can also be useful in that, upon rethawing, the fruit material is structurally more susceptible to juice extraction. The liquid input to the first extraction stage is water at a water-to-fruit material ratio of about 1:1 to about 8:1, e.g., about 1.5:1, 2:1, 2.5:1, 3:1, 3.5:1. 4:1, 4.5:1, 5:1, 5.5:1, 6:1, 6.5:1, 7:1, or about 7.5:1. The residence time of the fruit material in the juice extractor during the juice extraction can be, e.g., about 1 to about 30 minutes, e.g., about 1 to about 5 minutes, about 1 to about 10 minutes, about 2 to about 20 minutes, about 10 to about 20 minutes, about 20 to about 30 minutes, or about 15 to about 30 minutes. In some instances, the residence time can be at least or about 3 minutes, e.g., at least or about 5 minutes. Further, skilled practitioners will appreciate that the residence time of the fruit material in the extractor can be adjusted upwardly or downwardly (e.g., to less than 5 minutes, e.g., about 1 minutes to about 3 minutes) based on the desired outcome and any number of factors and conditions, e.g., shorter extraction times may be used with higher extraction temperatures. The liquid output of the juice extraction stage is a juice extract, which can be collected, e.g., by rapidly cooling the extract and recovering the extract. The juice extraction, as discussed above, is performed at relatively low temperature (e.g., about 20° C. to about 50° C.), and optionally, e.g., at a relatively high efficiency (e.g., effecting the removal of greater than 90% of the sugars and acids present in the fruit feedstock), which can avoid the detrimental effects on juice quality often associated with higher temperature extraction, such as reduced shelf-life characteristics and off notes in juice flavor stemming from elevated tannin levels. Moreover, a low temperature extraction (e.g., about 20° C. to about 50° C.) preferentially removes the sugars and acids present in the fruit feedstock, leaving behind in the once-extracted fruit material a relatively higher proportion of the feedstock's inherent phytochemical content (e.g., anthocyanins, PACs, and other phenolic compounds).

Anthocyanin Extraction

Optionally, an anthocyanin extraction stage can be performed after the juice extraction stage or performed independently of a juice extraction stage, and it can be operated at a higher temperature than that of the juice extraction stage, e.g., about 40° C. to about 120° C., or about 90° C. to about 110° C., e.g., about 42° C., 45° C., 47° C., 50° C., 52° C., 55° C., 60° C., 65° C., 70° C., 72° C., 75° C., 80° C., 85° C., 90° C., 95° C., 100° C., 102° C., 105° C., 108° C., 110° C., 112° C., 115° C., 118° C., 119° C., or at a temperature in a range between any two of the above-referenced values, under a pressure of about 0 psi to about 500 psi, or about 250 psi to about 1000 psi, to maintain water in a liquid state, e.g., about 0 psi to about 1000 psi, about 100 psi to about 1000 psi, about 500 psi to about 1000 psi, about 250 psi to about 500 psi, about 500 psi to about 800 psi, about 800 psi to about 1000 psi, or about 1 psi, 5 psi, 10 psi, 25 psi, 50 psi, 75 psi, 100 psi, 125 psi, 150 psi, 175 psi, 200 psi, 225 psi, 250 psi, 275 psi, 300 psi, 325 psi, 350 psi, 375 psi, 400 psi, 425 psi, 450 psi, 475 psi, 500 psi, 525 psi, 550 psi, 575 psi, 600 psi, 625 psi, 650 psi, 675 psi, 700 psi, 725 psi, 750 psi, 775 psi, 800 psi, 825 psi, 850 psi, 875 psi, 900 psi, 925 psi, 950 psi, 975 psi, or about 1000 psi. For example, depending upon the desired outcome of the process, the anthocyanin extraction stage can be performed in a range of temperatures of about 40° C. to about 50° C., about 45° C. to about 55° C., about 50° C. to about 60° C., about 55° C. to about 65° C., about 60° C. to about 70° C., about 65° C. to about 75°

C., about 70° C. to about 80° C., about 75° C. to about 85° C., about 80° C. to about 90° C., about 85° C. to about 95° C., about 90° C. to about 100° C., about 95° C. to about 105° C., about 100° C. to about 105° C., about 102° C. to about 108° C., or about 105° C. to about 110° C. Other exemplary ranges include about 108° C. to about 112° C., about 110° C. to about 115° C., about 112° C. to about 116° C., or about 115° C. to about 120° C. Skilled practitioners will appreciate that any art-known method and/or apparatus can be used to perform this anthocyanin extraction in accordance with the present invention. For example, the countercurrent apparatus described above can be employed.

In an exemplary anthocyanin extraction stage, the once-extracted fruit material or any fruit material is provided as solid input to an anthocyanin extraction stage, which in this example employs a countercurrent apparatus, e.g., a modified version of an extractor as described above and in US 2008/0251454 and U.S. Pat. Nos. 5,320,861 and 5,419,251. The extractor used in the anthocyanin extraction may be, e.g., a different compartment of the same extractor used in the juice extraction or a second, different extractor. When a different extractor is used for the anthocyanin extraction, the once-extracted fruit material may be moved, e.g., via a vibratory conveyor from the first extractor to the second extractor. The extraction temperature may be controlled using any means known to those of skill in the art, e.g., by regulating the trough temperature (e.g., by heating with a circulating water jacket positioned about the trough). Alternatively or in addition, one may control temperature by controlling the temperature of the fruit material and/or extraction liquid prior to introduction to the extractor.

The liquid input to the anthocyanin extractor is water at a water-to-fruit material ratio of about 1:1 to about 8:1, e.g., about 1.5:1, 2:1, 2.5:1, 3:1, 3.5:1. 4:1, 4.5:1, 5:1, 5.5:1, 6:1, 6.5:1, 7:1, or about 7.5:1. The residence time of the fruit material in the anthocyanin extractor during the anthocyanin extraction can be, e.g., about 2 minutes to about 10 minutes, e.g., about 2 minutes to about 5 minutes, about 4 minutes to about 6 minutes, or about 7 minutes to about 10 minutes. In some instances, the residence time can be at least or about 2 minutes, e.g., at least or about 5 minutes. Further, skilled practitioners will appreciate that the residence time of the fruit material in the extractor can be adjusted upwardly or downwardly (e.g., to less than 2 minutes, e.g., about 1 minute to about 10 minutes) based on the desired outcome and any number of factors and conditions, e.g., to avoid burning fruit material, shorter extraction times may be used with higher extraction temperatures. The solid output of the extraction stage is an extracted fruit material characterized by the removal of at least or about 10%, e.g., at least or about 20%, 30%, 40%, 50%, 60%, 70%, 80%, or at least or about 90%, of residual anthocyanins that were present in the once-extracted fruit feedstock or fruit material. The liquid output of the anthocyanin extraction stage is an anthocyanin-rich extract, which can be collected, e.g., by rapidly cooling the extract and recovering the extract.

Pectin Extraction

Optionally, a pectin extraction stage can be performed after the anthocyanin extraction stage or performed independently of an anthocyanin extraction stage, and it can be operated at about the same temperature or at a higher temperature than that of the anthocyanin extraction stage, e.g., about 100° C. to about 145° C., or about 120° C. to about 140° C., e.g., about 105° C., 110° C., 115° C., 120° C., 125° C., 130° C., 135° C., 136° C., 137° C., 138° C., 139° C., 140° C., 141° C., 142° C., 143° C., 144° C., or at a temperature in a range between any two of the above-referenced values, under a pressure of about 100 psi to about 1000 psi to maintain water in a liquid state, e.g., about 250 psi to about 1000 psi, about 300 psi to about 1000 psi, about 400 psi to about 1000 psi, about 500 psi to about 1000 psi, about 250 psi to about 500 psi, about 500 psi to about 800 psi, about 800 psi to about 1000 psi, or about 100 psi, 125 psi, 150 psi, 175 psi, 200 psi, 225 psi, 250 psi, 275 psi, 300 psi, 325 psi, 350 psi, 375 psi, 400 psi, 425 psi, 450 psi, 475 psi, 500 psi, 525 psi, 550 psi, 575 psi, 600 psi, 625 psi, 650 psi, 675 psi, 700 psi, 725 psi, 750 psi, 775 psi, 800 psi, 825 psi, 850 psi, 875 psi, 900 psi, 925 psi, 950 psi, 975 psi, or about 1000 psi. For example, depending upon the desired outcome of the process, the pectin extraction can be performed in a range of temperatures of about 100° C. to about 110° C., about 105° C. to about 115° C., about 110° C. to about 120° C., about 115° C. to about 125° C., about 120° C. to about 130° C., about 125° C. to about 135° C., about 135° C. to about 140° C., about 138° C. to about 142° C., or about 140° C. to about 145° C. Skilled practitioners will appreciate that any art-known method and/or apparatus can be used to perform this pectin extraction in accordance with the present invention. For example, the countercurrent apparatus described above can be employed.

In an exemplary pectin extraction stage, the anthocyanin-extracted fruit material or any fruit material is provided as solid input to a pectin extraction stage, which in this example employs a countercurrent apparatus, e.g., a modified version of an extractor as described above and in US 2008/0251454 and U.S. Pat. Nos. 5,320,861 and 5,419,251. The extractor used in the pectin extraction may be, e.g., a different compartment of the same extractor used in the juice and/or the anthocyanin extractions or a different extractor. When a different extractor is used for the pectin extraction, the anthocyanin-extracted fruit material or any fruit material may be moved, e.g., via a vibratory conveyor from the anthocyanin extractor stage to the pectin extractor. The extraction temperature may be controlled using any means known to those of skill in the art, e.g., by regulating the trough temperature (e.g., by heating with a circulating water jacket positioned about the trough). Alternatively or in addition, one may control temperature by controlling the temperature of the fruit material and/or extraction liquid prior to introduction to the extractor.

The liquid input to the pectin extractor is water at a water-to-fruit material ratio of about 1:1 to about 8:1, e.g., about 1.5:1, 2:1, 2.5:1, 3:1, 3.5:1. 4:1, 4.5:1, 5:1, 5.5:1, 6:1, 6.5:1, 7:1, or about 7.5:1. The residence time of the fruit material in the pectin extractor during the pectin extraction can be, e.g., about 1 to about 30 minutes, e.g., about 1 to about 5 minutes, about 1 to about 10 minutes, about 2 to about 20 minutes, about 10 to about 20 minutes, about 20 to about 30 minutes, or about 15 to about 30 minutes. In some instances, the residence time can be at least or about 3 minutes, e.g., at least or about 5 minutes. Further, skilled practitioners will appreciate that the residence time of the fruit material in the extractor can be adjusted upwardly or downwardly (e.g., to less than 5 minutes, e.g., about 1 minutes to about 3 minutes) based on the desired outcome and any number of factors and conditions, e.g., to avoid burning fruit material, shorter extraction times may be used with higher extraction temperatures. The solid output of the extraction stage is a pectin-extracted fruit material, and the liquid output of the third extraction stage is a pectin extract, which can be collected, e.g., by rapidly cooling the extract and recovering the extract.

PAC Extraction

Optionally, a PAC extraction stage can be performed after the pectin extraction stage or performed independently of a pectin extraction stage, and it can be operated at about the same temperature or at a higher temperature than that of the pectin extraction stage, e.g., about 130° C. to about 165° C., e.g., about 132° C., 135° C., 140° C., 145° C., 150° C., 153° C., 156° C., 157° C., 158° C., 159° C., 160° C., 161° C., 162° C., 163° C., 164° C., or at a temperature in a range between any two of the above-referenced values, under a pressure of about 100 psi to about 1500 psi to maintain water in a liquid state, e.g., about 250 psi to about 1000 psi, about 300 psi to about 1500 psi, about 500 psi to about 1500 psi, about 500 psi to about 1000 psi, about 250 psi to about 500 psi, about 500 psi to about 800 psi, about 800 psi to about 1000 psi, or about 100 psi, 125 psi, 150 psi, 175 psi, 200 psi, 225 psi, 250 psi, 275 psi, 300 psi, 325 psi, 350 psi, 375 psi, 400 psi, 425 psi, 450 psi, 475 psi, 500 psi, 525 psi, 550 psi, 575 psi, 600 psi, 625 psi, 650 psi, 675 psi, 700 psi, 725 psi, 750 psi, 775 psi, 800 psi, 825 psi, 850 psi, 875 psi, 900 psi, 925 psi, 950 psi, 975 psi, 1000 psi, 1100 psi, 1200 psi, 1300 psi, 1400 psi, or about 1450 psi. For example, depending upon the desired outcome of the process, the fourth extraction can be performed in a range of temperatures of about 130° C. to about 140° C., about 135° C. to about 145° C., about 140° C. to about 150° C., about 145° C. to about 155° C., about 150° C. to about 160° C., about 155° C. to about 160° C., about 158° C. to about 162° C., or about 160° C. to about 165° C. Skilled practitioners will appreciate that any art-known method and/or apparatus can be used to perform this PAC extraction in accordance with the present invention. For example, the countercurrent apparatus described above can be employed.

In an exemplary PAC extraction stage, the pectin-extracted fruit material or any fruit material is provided as solid input to a PAC extraction stage, which in this example employs a countercurrent apparatus, e.g., a modified version of an extractor as described above and in US 2008/0251454 and U.S. Pat. Nos. 5,320,861 and 5,419,251. The extractor used in the PAC extraction stage may be, e.g., a different compartment of the same extractor used in the juice, anthocyanin, and/or pectin extractions or a different extractor. When a different extractor is used for the PAC extraction stage, the pectin-extracted fruit material or any fruit material may be moved, e.g., via a vibratory conveyor from the pectin extractor to the PAC extractor. The extraction temperature may be controlled using any means known to those of skill in the art, e.g., by regulating the trough temperature (e.g., by heating with a circulating water jacket positioned about the trough). Alternatively or in addition, one may control temperature by controlling the temperature of the fruit material and/or extraction liquid prior to introduction to the extractor.

The liquid input to the PAC extractor is water at a water-to-fruit material ratio of about 1:1 to about 8:1, e.g., about 1.5:1, 2:1, 2.5:1, 3:1, 3.5:1. 4:1, 4.5:1, 5:1, 5.5:1, 6:1, 6.5:1, 7:1, or about 7.5:1. The residence time of the fruit material in the PAC extractor during the PAC extraction can be, e.g., about 2 minutes to about 10 minutes, e.g., about 2 minutes to about 5 minutes, about 4 minutes to about 6 minutes, or about 7 minutes to about 10 minutes. In some instances, the residence time can be at least or about 2 minutes, e.g., at least or about 5 minutes. Further, skilled practitioners will appreciate that the residence time of the fruit material in the extractor can be adjusted upwardly or downwardly (e.g., to less than 2 minutes, e.g., about 1 minute to about 10 minutes) based on the desired outcome and any number of factors and conditions, e.g., to avoid burning fruit material, shorter extraction times may be used with higher extraction temperatures. The solid output of the extraction stage is a PAC-extracted fruit material, and the liquid output of the fourth extraction stage is a PAC extract, which can be collected, e.g., by rapidly cooling the extract and recovering the extract.

Phenolic Compound Extraction

In one embodiment, a phenolic compound extraction stage can be performed after the PAC extraction stage or performed independently of any other extraction stage, and it can be operated at about the same temperature or at a higher temperature than that of the PAC extraction stage, e.g., about 145° C. to about 200° C., e.g., about 145° C., 150° C., 155° C., 160° C., 165° C., 170° C., 172° C., 175° C., 178° C., 180° C., 182° C., 185° C., 187° C., 190° C., 192° C., 195° C., 198° C., or at a temperature in a range between any two of the above-referenced values, under a pressure of about 500 psi to about 1500 psi, or about 250 psi to about 1000 psi, to maintain water in a liquid state, e.g., about 300 psi to about 1500 psi, about 500 psi to about 1500 psi, about 500 psi to about 1000 psi, about 250 psi to about 500 psi, about 500 psi to about 800 psi, about 800 psi to about 1000 psi, or about 250 psi, 275 psi, 300 psi, 325 psi, 350 psi, 375 psi, 400 psi, 425 psi, 450 psi, 475 psi, 500 psi, 525 psi, 550 psi, 575 psi, 600 psi, 625 psi, 650 psi, 675 psi, 700 psi, 725 psi, 750 psi, 775 psi, 800 psi, 825 psi, 850 psi, 875 psi, 900 psi, 925 psi, 950 psi, 975 psi, 1000 psi, 1100 psi, 1200 psi, 1300 psi, 1400 psi, or about 1450 psi. For example, depending upon the desired outcome of the process, the phenolic compound extraction stage can be performed in a range of temperatures of about 145° C. to about 155° C., about 150° C. to about 160° C., about 155° C. to about 165° C., about 160° C. to about 170° C., about 165° C. to about 175° C., about 170° C. to about 175° C., about 175° C. to about 180° C., about 180° C. to about 185° C. about 185° C. to about 190° C., about 190° C. to about 195° C., or about 195° C. to about 200° C. Skilled practitioners will appreciate that any art-known method and/or apparatus can be used to perform this phenolic compound extraction in accordance with the present invention. For example, the countercurrent apparatus described above can be employed.

In an exemplary phenolic compound extraction stage, the PAC-extracted fruit material or any fruit material is provided as solid input to a phenolic compound extraction stage, which in this example employs a countercurrent apparatus, e.g., a modified version of an extractor as described above and in US 2008/0251454 and U.S. Pat. Nos. 5,320,861 and 5,419,251. The extractor used in the phenolic compound extraction stage may be, e.g., a different compartment of the same extractor used in the juice, anthocyanin, pectin, and/or PAC extractions or a different extractor. When a different extractor is used for the phenolic compound extraction, the PAC-extracted fruit material or any fruit material may be moved, e.g., via a vibratory conveyor from an extractor to the phenolic compound extractor. The extraction temperature may be controlled using any means known to those of skill in the art, e.g., by regulating the trough temperature (e.g., by heating with a circulating water jacket positioned about the trough). Alternatively or in addition, one may control temperature by controlling the temperature of the fruit material and/or extraction liquid prior to introduction to the extractor.

The liquid input to the phenolic compound extractor is water at a water-to-fruit material ratio of about 1:1 to about 8:1, e.g., about 1.5:1, 2:1, 2.5:1, 3:1, 3.5:1. 4:1, 4.5:1, 5:1, 5.5:1, 6:1, 6.5:1, 7:1, or about 7.5:1. The residence time of the fruit material in the phenolic compound extractor during the phenolic compound extraction can be, e.g., about 1 to about 30 minutes, e.g., about 1 to about 5 minutes, about 1 to about 10 minutes, about 2 to about 20 minutes, about 10 to about 20 minutes, about 20 to about 30 minutes, or about 15 to about 30 minutes. In some instances, the residence time can be at least or about 3 minutes, e.g., at least or about 5 minutes. Further, skilled practitioners will appreciate that the residence time of the fruit material in the extractor can be adjusted upwardly or downwardly (e.g., to less than 5 minutes, e.g., about 1 minutes to about 3 minutes) based on the desired outcome and any number of factors and conditions, e.g., to avoid burning fruit material, shorter extraction times may be used with higher extraction temperatures. The solid output of the extraction stage is a phenol-extracted fruit material, and the liquid output of the fifth extraction stage is a phenolic compound extract, which can be collected, e.g., by rapidly cooling the extract and recovering the extract.

EXAMPLES

The invention is further described in the following examples, which do not limit the scope of the invention described in the claims.

Bulk-frozen presscake was subjected to standard extractions in water at 100° C., 120° C., 140° C., or 160° C. under 500, 1000, or 1500 psi for three cycles of 1, 3, and 5 minutes each to provide an extracted fruit material and an extract. The extracts from the four different extraction temperatures were assayed for anthocyanin (Brown et al., *J AOAC Int* 94:459-466, 2011), pectin, proanthocyanidin (de Pascual-Teresa et al., *J Agric Food Chem* 46:4209-4213, 1998; and Prior et al., *J Sci Food Agric* 90:1473-1478, 2010), and total phenolics (Asami et al., *J Agric Food Chem* 51:1237-1241, 2003). Pectin content was determined by hydrolyzing pectin in the extract using pectinase (Kluerzyme 150, Danisco) in a water batch at 45° C. for two hours. Hydrolyzed extract was quantified for galacturonic acid (IFU Method No. 78, 2004). Unhydrolyzed extract served as a control.

As shown in FIGS. 3 to 6, optimum extraction of anthocyanins was found to be around 100° C. Optimum pectin extraction was found to be around 140° C. Most amounts of PACs were extracted at about 160° C. and other phenolics were extracted above 160° C.

These examples clearly demonstrate that subcritical water can be used to efficiently extract anthocyanin, pectin, proanthocyanidin, and other phenolic compounds at various temperatures. It will be understood by skilled practitioners that the extractions could be performed directly as described or sequentially by performing extractions of increasingly higher temperatures.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A method for processing fruit material comprising:
   treating the fruit material in a first extraction by immersing the fruit material in water at a temperature of about 20° C. to about 50° C., thereby providing a once-extracted fruit material and a juice extract; and
   collecting the juice extract;
   treating the once-extracted fruit material in a second extraction by immersing the once-extracted fruit material in water at a temperature of about 40° C. to about 120° C. under a pressure of about 100 psi to about 1500 psi, thereby providing a twice-extracted fruit material and an anthocyanin-rich extract;
   collecting the anthocyanin-rich extract
   treating the twice-extracted fruit material in a third extraction by immersing the twice-extracted fruit material in water at a temperature of about 100° C. to about 145° C., thereby providing a thrice extracted fruit material and a pectin-rich extract;
   collecting the pectin-rich extract; and
   treating the thrice-extracted fruit material in a fourth extraction by immersing the thrice-extracted fruit material in water at a temperature of about 130° C. to about 165° C., thereby providing a four times-extracted fruit material and a proanthocyandin-rich extract; and
   collecting the proanthocyandin-rich extract.

2. The method of claim 1, wherein the method further comprises:
   treating the four times-extracted fruit material in a fifth extraction by immersing the four times-extracted fruit material in water at a temperature of about 145° C. to about 200° C., thereby providing a five times-extracted fruit material and a phenol-rich extract; and
   collecting the phenol-rich extract.

3. The method of claim 1, wherein the first extraction is performed in a vessel, and the second extraction and the third extraction are performed in the same vessel.

4. The method of claim 3, wherein the vessel is under a pressure of about 0 pounds per square inch (psi) to about 500 psi during the first extraction, the vessel is under a pressure of about 100 psi to about 500 psi during the second extraction, and the vessel is under a pressure of about 100 psi to about 1000 psi during the third extraction.

5. The method of claim 1, wherein the first extraction is performed in a vessel, and the second extraction, the third extraction, and the fourth extraction are performed in the same vessel.

6. The method of claim 5, wherein the vessel is under a pressure of about 0 psi to about 500 psi during the first extraction, the vessel is under a pressure of about 100 psi to about 500 psi during the second extraction, the vessel is under a pressure of about 100 psi to about 1000 psi during the third extraction, and the vessel is under a pressure of about 100 psi to about 1500 psi during the fourth extraction.

7. The method of claim 2, wherein the first extraction is performed in a vessel, and the second extraction, the third extraction, the fourth extraction, and the fifth extraction are performed in the same vessel.

8. The method of claim 7, wherein the vessel is under a pressure of about 0 psi to about 500 psi during the first extraction, the vessel is under a pressure of about 100 psi to about 500 psi during the second extraction, the vessel is under a pressure of about 100 psi to about 1000 psi during the third extraction, the vessel is under a pressure of about 100 psi to about 1500 psi during the fourth extraction, and the vessel is under a pressure of about 500 psi to about 1500 psi during the fifth extraction.

9. The method of claim 1, wherein the first extraction is performed in a first vessel, the second extraction is performed in a second vessel, and the third extraction is performed in a third vessel.

10. The method of claim 9, wherein the first vessel is under a pressure of about 0 psi to about 500 psi during the first extraction, the second vessel is under a pressure of about 100 psi to about 500 psi during the second extraction, and the third vessel is under a pressure of about 100 psi to about 1000 psi during the third extraction.

11. The method of claim 1, wherein the first extraction is performed in a first vessel, the second extraction is performed in a second vessel, the third extraction is performed in a third vessel, and the fourth extraction is performed in a fourth vessel.

12. The method of claim 11, wherein the first vessel is under a pressure of about 0 psi to about 500 psi during the first extraction, the second vessel is under a pressure of about 100 psi to about 500 psi during the second extraction, the third vessel is under a pressure of about 100 psi to about 1000 psi during the third extraction, and the fourth vessel is under a pressure of about 100 psi to about 1500 psi during the fourth extraction.

13. The method of claim 2, wherein the first extraction is performed in a first vessel, the second extraction is performed in a second vessel, the third extraction is performed in a third vessel, the fourth extraction is performed in a fourth vessel, and the fifth extraction is performed in a fifth vessel.

14. The method of claim 13, wherein the first vessel is under a pressure of about 0 psi to about 500 psi during the first extraction, the second vessel is under a pressure of about 100 psi to about 500 psi during the second extraction, the third vessel is under a pressure of about 100 psi to about 1000 psi during the third extraction, and the fourth vessel is under a pressure of about 100 psi to about 1500 psi during the fourth extraction, and the fifth vessel is under a pressure of about 500 psi to about 1500 psi during the fifth extraction.

15. The method of claim 1, wherein the ratio of water-to-fruit material is about 1:1 to about 8:1 in the first extraction, the second extraction, and/or the third extraction.

16. The method of claim 1, wherein the fruit material is a cranberry fruit, presscake, or pomace.

17. A method for processing fruit material comprising:
treating the fruit material in a first extraction by immersing the fruit material in a vessel with water at a temperature of about 100° C. to about 145° C. and under a pressure of about 100 psi to about 1000 psi, thereby providing a once extracted fruit material and a pectin-rich extract; and
collecting the pectin-rich extract.

18. A method for processing fruit material comprising:
treating the fruit material in a first extraction by immersing the fruit material in a vessel with water at a temperature of about 130° C. to about 165° C. and under a pressure of about 100 psi to about 1500 psi, thereby providing a once extracted fruit material and a proanthocyandin-rich extract; and
collecting the proanthocyandin-rich extract.

* * * * *